United States Patent
Vander Lind et al.

(10) Patent No.: US 10,933,989 B2
(45) Date of Patent: Mar. 2, 2021

(54) BISTABLE PITCH PROPELLER SYSTEM WITH UNIDIRECTIONAL PROPELLER ROTATION

(71) Applicant: Kitty Hawk Corporation, Palo Alto, CA (US)

(72) Inventors: Damon Vander Lind, Alameda, CA (US); Todd Reichert, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/584,570

(22) Filed: Sep. 26, 2019

(65) Prior Publication Data

US 2020/0039634 A1 Feb. 6, 2020

Related U.S. Application Data

(63) Continuation of application No. 15/225,028, filed on Aug. 1, 2016, now Pat. No. 10,569,861.

(51) Int. Cl.
| | |
|---|---|
| *B64C 27/57* | (2006.01) |
| *B64C 11/34* | (2006.01) |
| *B64C 11/46* | (2006.01) |
| *B64C 29/02* | (2006.01) |

(52) U.S. Cl.
CPC .......... *B64C 27/57* (2013.01); *B64C 11/343* (2013.01); *B64C 11/46* (2013.01); *B64C 29/02* (2013.01)

(58) Field of Classification Search
CPC ............................. B64C 11/343; B64C 27/57
See application file for complete search history.

(56) References Cited

U.S. PATENT DOCUMENTS

| | | | |
|---|---|---|---|
| 2,444,539 A | 7/1948 | Sharpes | |
| 2,455,378 A | 12/1948 | McCoy | |
| 3,017,932 A | 1/1962 | Chilman | |
| 3,207,227 A | 9/1965 | Timewell | |
| 3,220,484 A | 11/1965 | Elmer | |
| 5,104,291 A | 4/1992 | Morrison | |
| 5,551,649 A * | 9/1996 | Kaptein | B64C 11/50 244/1 N |
| 5,593,280 A | 1/1997 | Takada | |
| 7,462,015 B2 | 12/2008 | Mazet | |
| 8,790,081 B1 | 7/2014 | Burger | |
| 8,794,920 B2 | 8/2014 | Bacic | |
| 10,569,861 B2 * | 2/2020 | Vander Lind | B64C 27/57 |

(Continued)

*Primary Examiner* — Justin D Seabe
*Assistant Examiner* — Michael L Sehn
(74) *Attorney, Agent, or Firm* — Van Pelt, Yi & James LLP

(57) ABSTRACT

A propeller includes a blade free to rotate about a longitudinal axis of the blade. The propeller also includes a mechanical stop positioned to engage mechanically a first portion of the blade and/or a first structure coupled mechanically to the blade when the blade is in a first position. The propeller also includes a magnetic stop positioned to engage magnetically a second portion of the blade and/or a second structure coupled mechanically to the blade when the blade is in a second position. The blade rotates to the first position against the mechanical stop when the propeller is rotated at a first rotational speed and the blade rotates to the second position against the magnetic stop when the propeller is rotated at a second rotational speed in a same direction as when the blade is in the first position.

5 Claims, 20 Drawing Sheets

(56) References Cited

U.S. PATENT DOCUMENTS

2005/0226727 A1   10/2005   Dennis
2011/0229319 A1   9/2011   Bacic
2015/0183510 A1   7/2015   Vander Lind

* cited by examiner

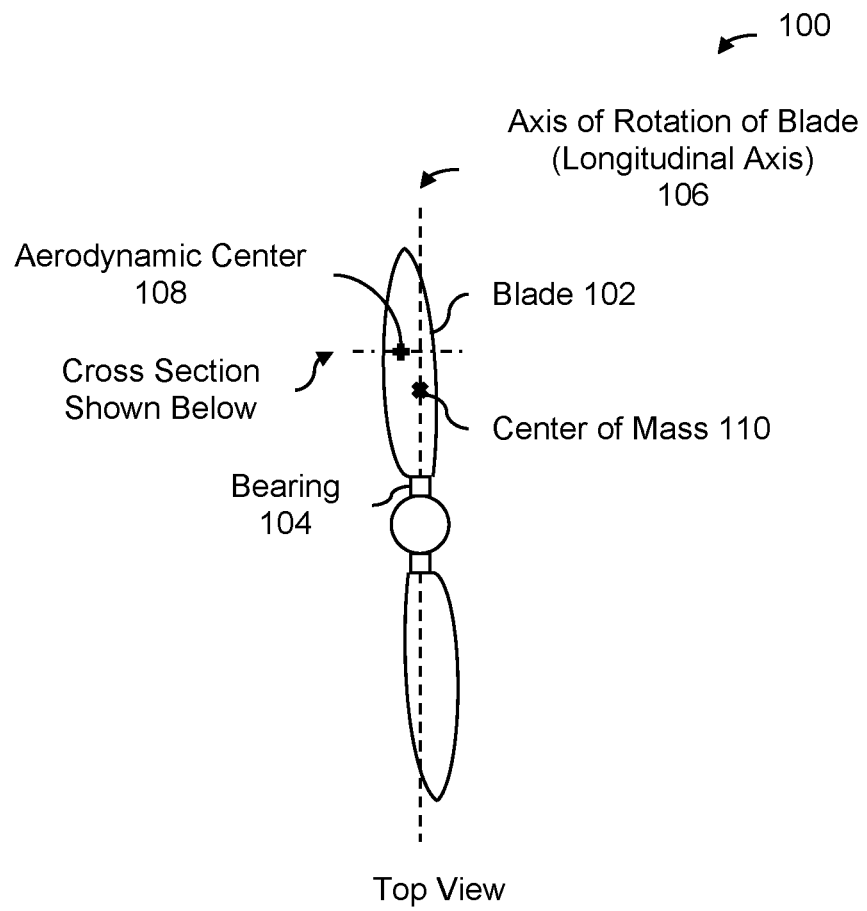
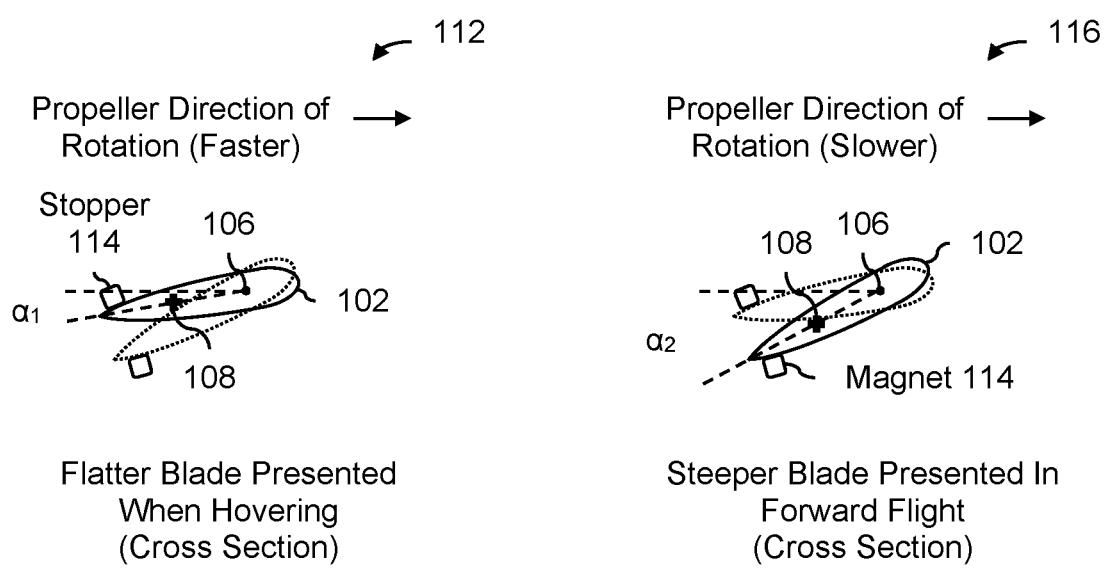
FIG. 1  Not Necessarily to Scale

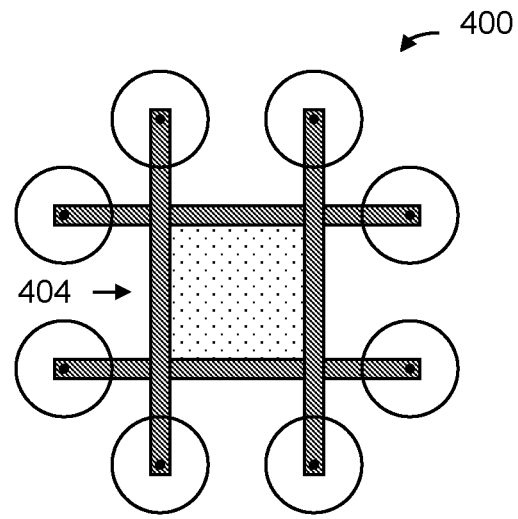
Top View
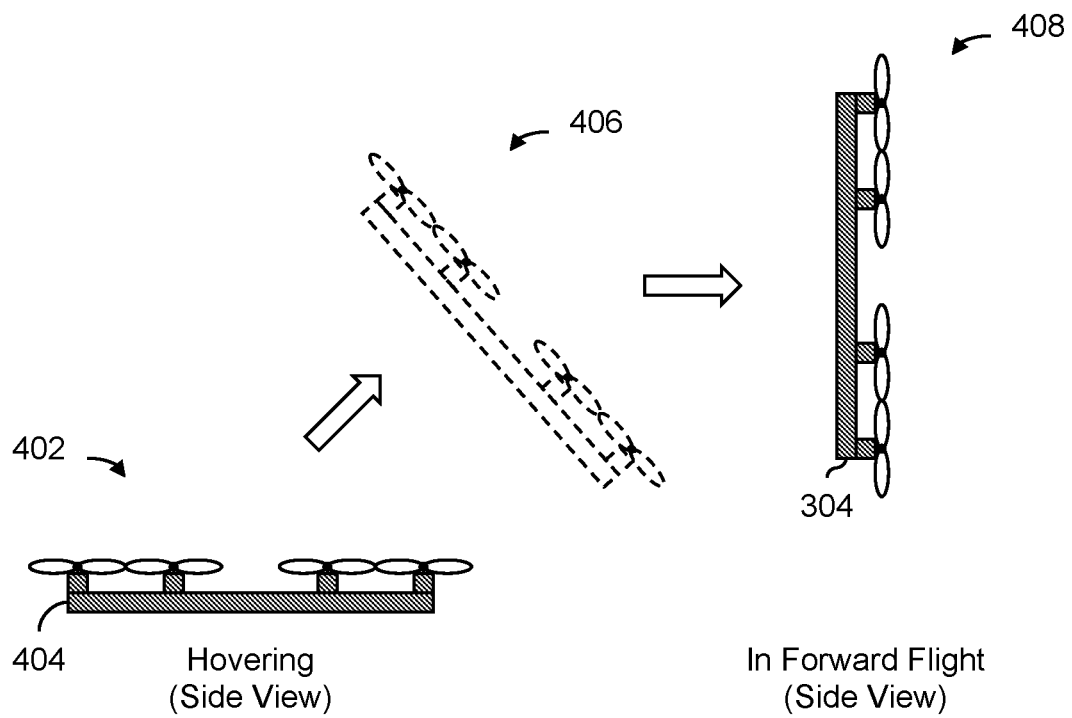
404 Hovering (Side View)
In Forward Flight (Side View)
FIG. 4  Not Necessarily to Scale

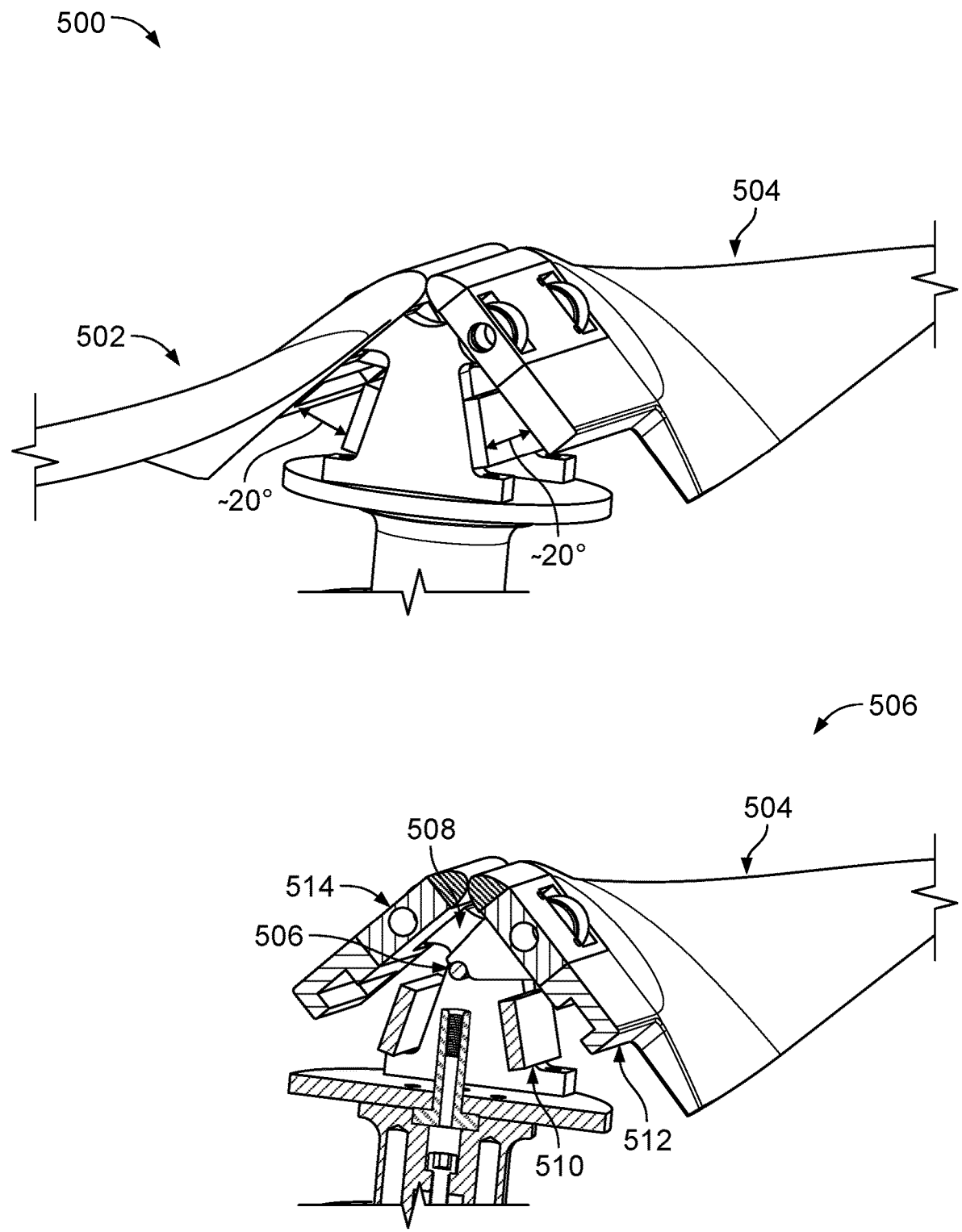
FIG. 5A  Not Necessarily to Scale

Not Necessarily to Scale

Not Necessarily to Scale

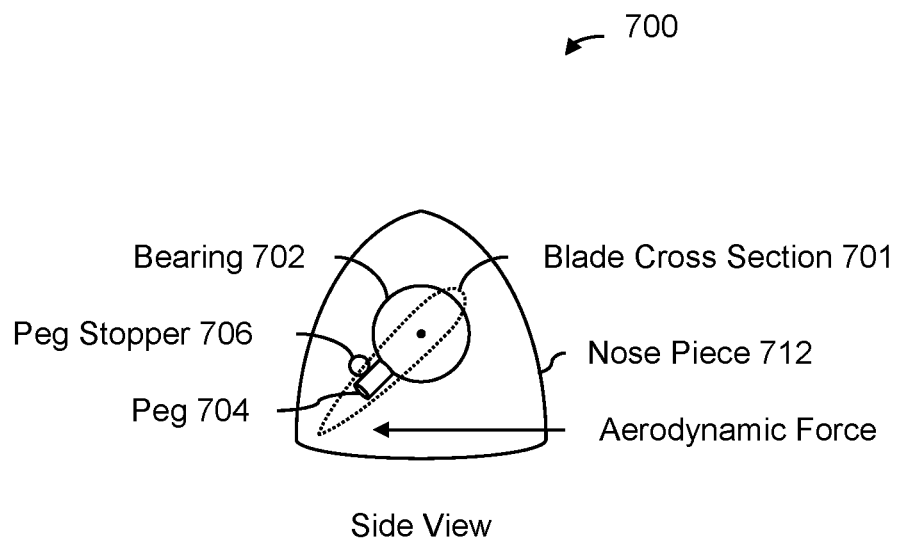
FIG. 7A  Not Necessarily to Scale

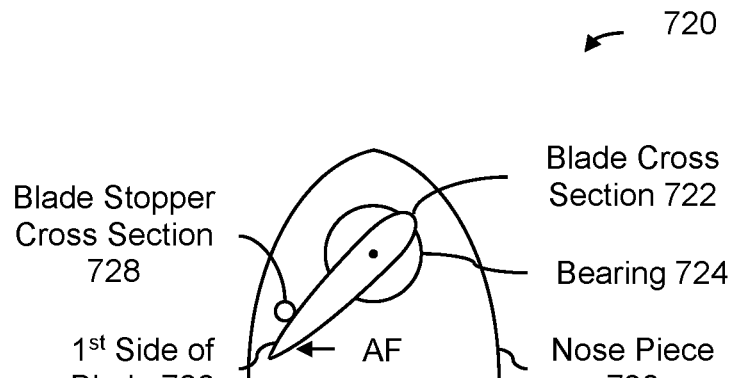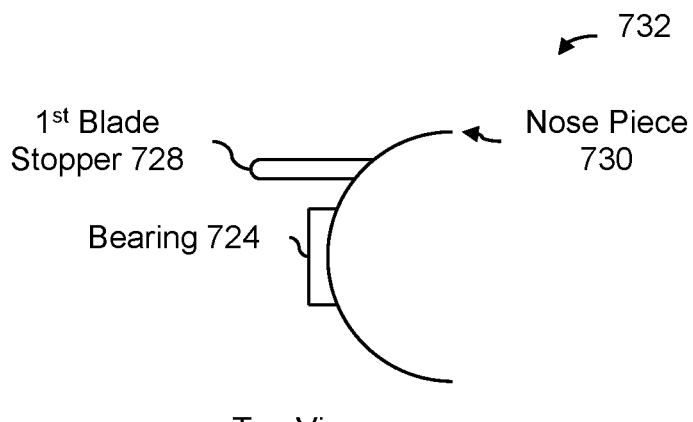
FIG. 7B

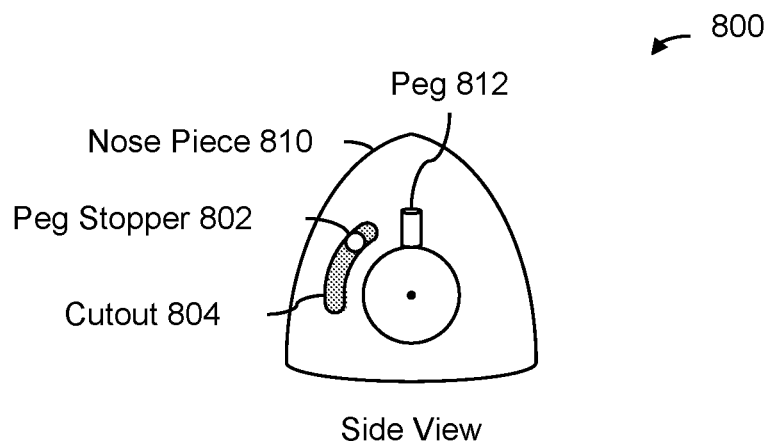
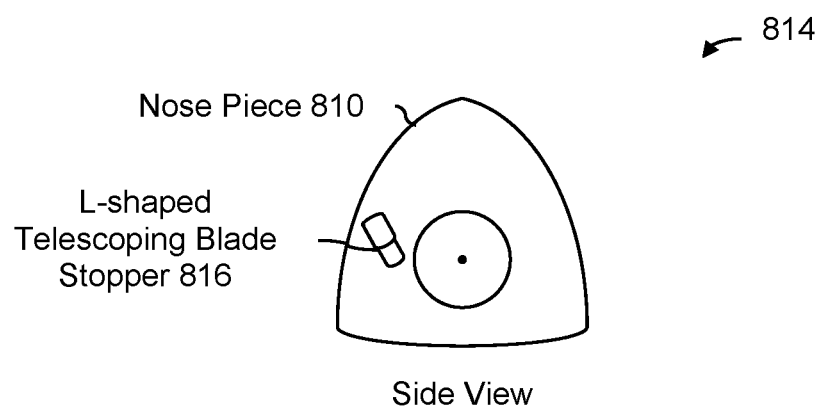
FIG. 8  Not Necessarily to Scale

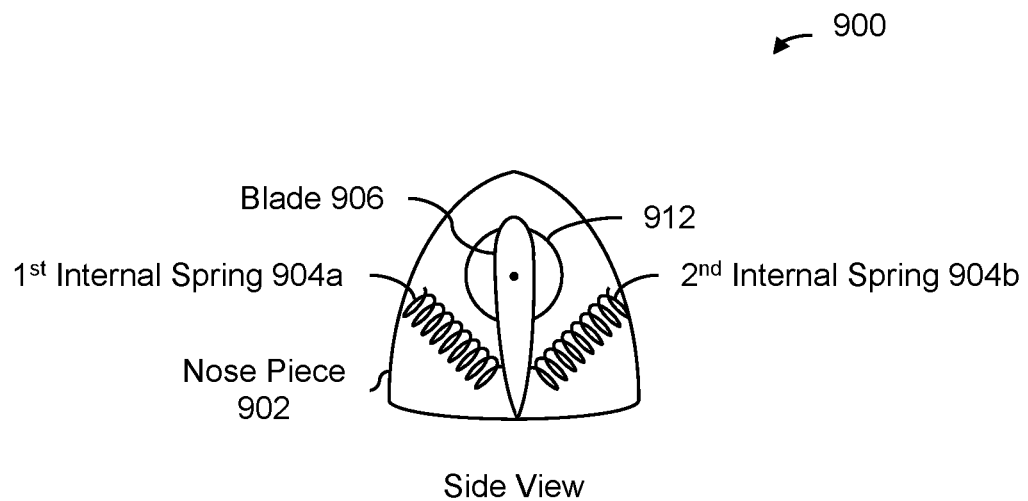
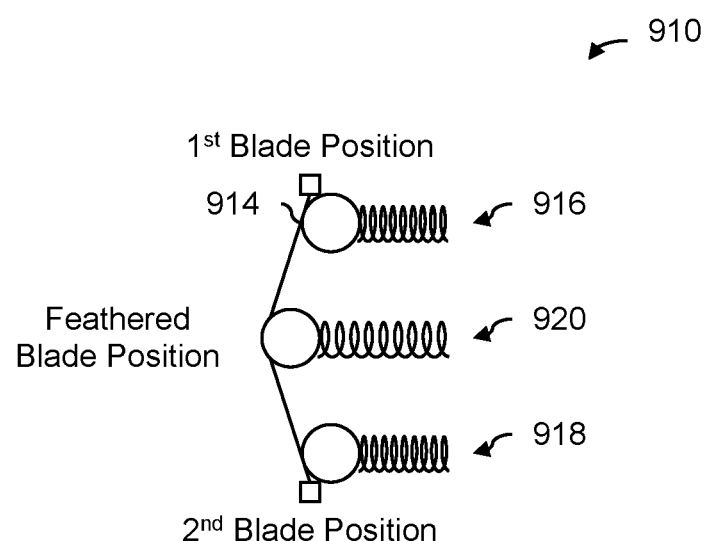
FIG. 9     Not Necessarily to Scale

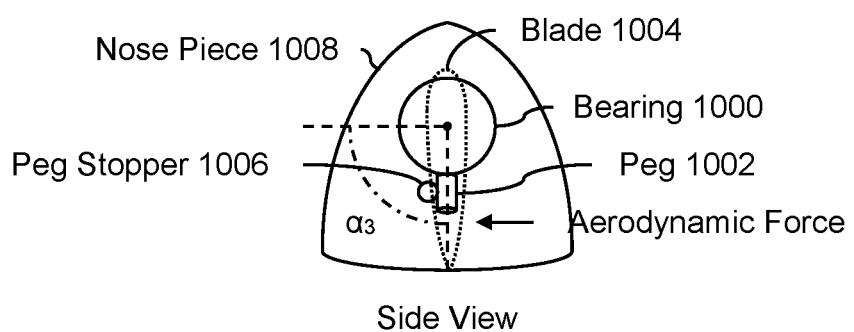
FIG. 10  Not Necessarily to Scale

BISTABLE PITCH PROPELLER SYSTEM WITH UNIDIRECTIONAL PROPELLER ROTATION

CROSS REFERENCE TO OTHER APPLICATIONS

This application is a continuation of co-pending U.S. patent application Ser. No. 15/225,028 entitled BISTABLE PITCH PROPELLER SYSTEM WITH UNIDIRECTIONAL PROPELLER ROTATION filed Aug. 1, 2016 which is incorporated herein by reference for all purposes.

BACKGROUND OF THE INVENTION

Rotors (e.g., those used by helicopters) typically are at a single, relatively shallow angle of attack to provide good lift. Propellers (e.g., wing-mounted) typically present a relatively greater angle of attack to more efficiently propel an aircraft through the air. Although systems exist for varying the pitch of a blade (e.g., so that the same propeller can switch between an angle of attack which is good for hovering and another which is good for forward flight), such systems typically use complex mechanical mechanisms that add weight and expense. It would be desirable if new systems could be developed which did not cost as much and/or weight as much.

BRIEF DESCRIPTION OF THE DRAWINGS

Various embodiments of the invention are disclosed in the following detailed description and the accompanying drawings.

FIG. 1 is a diagram illustrating various views of a bistable pitch propeller embodiment.

FIG. 4 is a diagram illustrating an embodiment of an octocopter which includes bistable pitch propellers.

FIG. 5A is a diagram showing an embodiment of a bistable pitch propeller with mechanical components to ensure that the two blades are in the same position at the same time.

FIG. 7A is a diagram illustrating an embodiment of a peg stopper which stops a peg connected to a bearing.

FIG. 7B is a diagram illustrating an embodiment of a blade stopper which is designed to come into contact with and stop a blade.

FIG. 8 is a diagram illustrating some embodiments of adjustable stoppers.

FIG. 9 is a diagram illustrating an embodiment of a bistable pitch propeller, where the blades are configured to return to a resting position when the propeller is not rotating.

FIG. 10 is a diagram illustrating an embodiment of a blade being held in a feathered blade position using a peg stopper.

DETAILED DESCRIPTION

Figure 2:
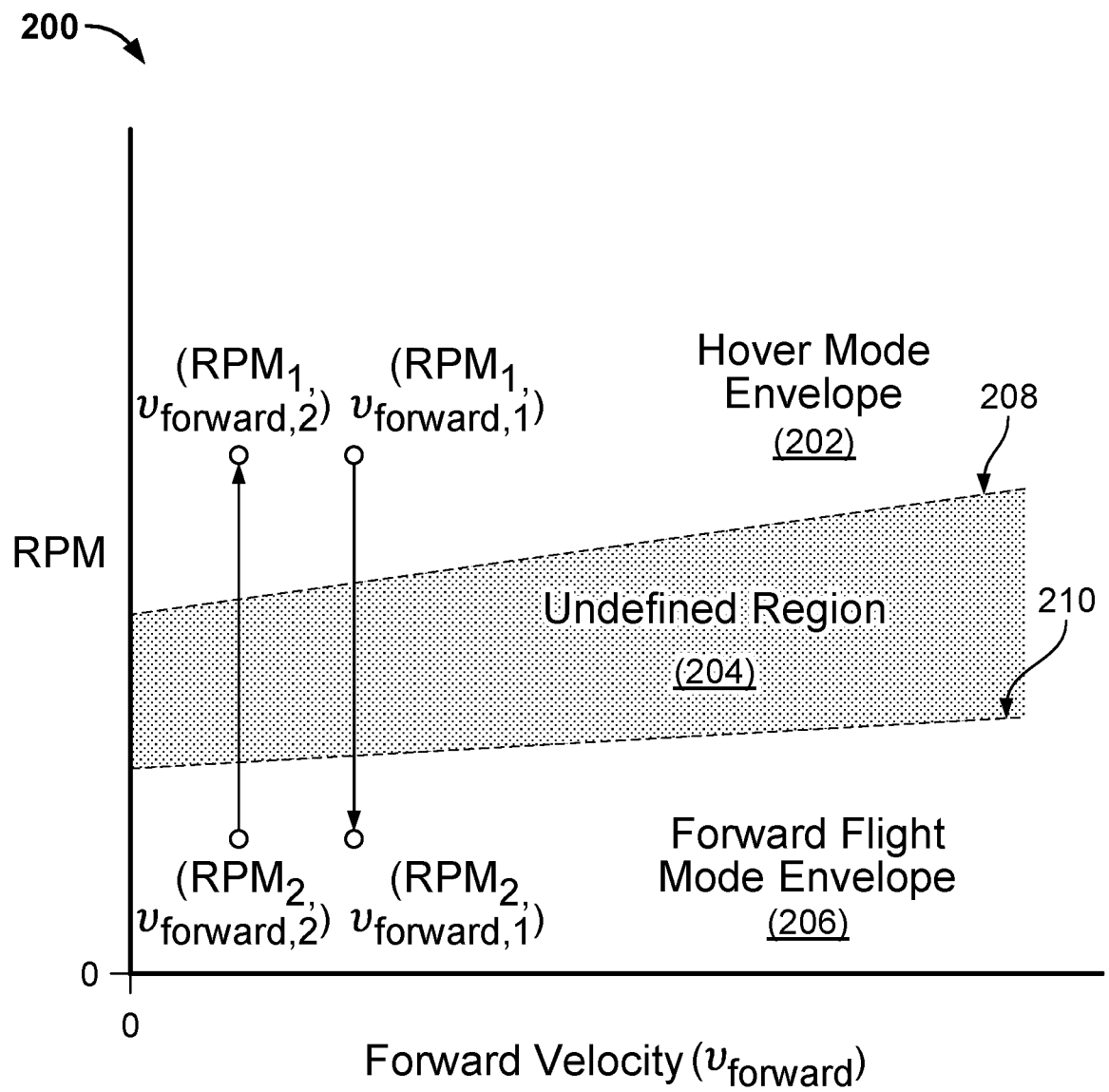
FIG. 2 is a diagram illustrating an embodiment of a hover mode envelope and a forward flight mode envelope.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A propeller that is mechanically stable in two (or more) different positions depending on the propeller's rotational speed (e.g., where the propeller always rotates in the same direction) is disclosed. In various embodiments, a propeller blade of the propeller system may be mounted so as to be rotatable about an at least roughly longitudinal axis of the blade. The blade is constructed and mounted such that the rotation of the propeller at a first rotational speed causes the blade to rotate (if/as necessary) about the longitudinal axis to a first stable position in which a portion of the blade and/or a structure coupled mechanically to the blade engages a mechanical stop, resulting in the blade presenting a first angle of attack. Rotation of the propeller at a second rotation speed (e.g., in the same direction of propeller rotation used to obtain the first angle of attack) results in the blade rotating (if/as necessary) about the longitudinal axis to a second stable position in which a portion of the blade and/or a structure coupled mechanically to the blade engages a magnetic stop, resulting in the blade presenting a second angle of attack. In some embodiments, aerodynamic forces act on the propeller blade to rotate the blade about its longitudinal axis to reach and/or maintain the first or second stable state, as applicable. In some embodiments, other forces (e.g., in addition to or as an alternative to aerodynamic forces) cause the blade(s) to rotate, such as torque or centripetal force. Although some examples herein describe aerodynamic force as the force which causes the blades to rotate, this is not intended to be limiting.

FIG. 1 is a diagram illustrating various views of a bistable pitch propeller embodiment. The bistable pitch propellers described in this figure and below are merely exemplary and are not intended to be limiting. For example, although two blades are shown in this figure, any number of blades may be employed. Similarly, the shape of the blade (e.g., any washout, the blade thickness, the blade width, any tapering, etc.), the position of the axis of rotation, the position of the aerodynamic center, and the position of the center of mass are merely exemplary and are not intended to be limiting.

In this example, diagram 100 shows a top view of the exemplary bistable pitch propeller, which in this example has two blades (102). Each blade is connected to a bearing (104), which permits the blade to rotate about an axis of rotation of the blade (106), sometimes referred to as the longitudinal axis. When the propeller rotates at a first rotational speed (e.g., in or associated with a first flight envelope), the blades pivot on their respective bearings about the axis of rotation of the blade (106). In some embodiments, the blades are relatively lightweight (e.g., to make rotation of the blades about the axis of rotation easier) and the rotation of the propeller causes an aerodynamic force to be applied to the aerodynamic center (108) of the blade. Since the aerodynamic center is not on the axis of rotation, the blade rotates when the propeller rotates.

Diagram 112 shows a cross section of one of the blades when that blade is in a hovering mode or configuration. The relatively high rate of rotation of the propeller causes the blade to be pushed because of the aerodynamic force applied to the blade and the blade's ability to rotate about its longitudinal axis (106) (e.g., because of the bearing). The aerodynamic force is sufficiently strong to push and hold the blade against the mechanical stopper (114), holding the blade in that position and at that pitch (i.e., an angle relative to a plane in which the propeller is being rotated). Diagram 112 thus shows a first blade pitch (or, more generally, blade position) at which the pitch propeller is stable in (e.g., the blade is rigid in this position and will not move so long as the propeller is being rotated at a sufficient rate). In one example, the propeller needs to be rotated at a rate of 3000 rpm or greater in order for the aerodynamic force to be sufficiently strong (e.g., to "pin" blades down to a sufficient degree).

In diagram 112, the blade pitch is cu, where cu is relatively small. A flatter blade is therefore presented to the relative wind. This flatter blade pitch provides more upward thrust and therefore is good for hovering where upward thrust is desired. For example, $\alpha_1$ may be defined as 0 degrees, and the blade tip might in that case have a twist angle of 10-20 degrees. Although an aircraft may be able to hover when the blade(s) is/are in some other position (e.g., a forward flight position, as is shown in diagram 116), the blade(s) may be put into this position when the aircraft is hovering in order to improve flight performance and/or reduce noise.

Diagram 116 shows a cross section of one of the blades when the propeller rotates at a slower rotational speed (e.g., in or associated with a second flight envelope). The slower rotational speed of the propeller (e.g., in the same direction as in diagram 112) causes the blade to no longer be pinned against stopper 114. The blade (102) lifts off of the stopper and is pulled toward magnet 114 and is held against the magnet. This blade position (pitch) is referred to as a second blade position (pitch).

In this position, the blade pitch is $\alpha_2$ where $\alpha_2 > \alpha_1$. The blade pitch presented to the relative wind in this position is therefore steeper. For example, $\alpha_2$ may be within an angular range of 20 to 30 degrees and might therefore have a blade twist that is 30 to 50 degrees at the tip. This steeper blade pitch offers better performance for forward flight, but is not as good for hovering, and may in fact stall in hover. The blade pitch (or, more generally, blade position) shown in diagram 116 is therefore an example of a second blade pitch (or, more generally, blade position) which the pitch propeller is stable in and the blade may be put into this position when the aircraft is in a forward flight mode.

The following figures illustrate some example flight mode envelopes associated with a bistable pitch propeller.

FIG. 2 is a diagram illustrating an embodiment of a hover mode envelope and a forward flight mode envelope. In the example shown, diagram 200 shows a graph where the x-axis is the forward velocity of an aircraft and the y-axis is the rotational speed (in this example in rotations per minute (RPM)) of a bistable pitch propeller of the aircraft. In this example, the rotational speed of a propeller is completely controllable and the forward velocity is dependent to some degree upon to the rotational speed of the propeller (e.g., the propeller causes the aircraft to move and so the forward velocity depend upon the rotational speed of the propeller, the position of the aircraft, the position of the blades, etc.). As described above, the force(s) which cause the blades to switch position may be some combination of aerodynamic force, torque, and/or centripetal force. Generally speaking, the aerodynamic force, torque, and centripetal force depend upon the RPM of the propeller and the forward velocity of the aircraft and so a flight envelope may be expressed in a variety of combinations of metrics (e.g., RPM and torque, RPM and aerodynamic force, etc.).

In this example, the graph is divided up into three non-overlapping regions: hover mode envelope 202, undefined region 204, and forward flight mode envelope 206. Hover mode envelope 202 is associated with the combination of forward velocities and rotational speeds at which the blades of the bistable pitch propeller will (e.g., always or consistently) be in a hover mode or configuration. For example, in this region, the blade would be in the blade position shown in diagram 112 in FIG. 1.

Forward flight mode envelope 202 is associated with the forward velocities and rotational speeds at which the blades of the bistable pitch propeller will (e.g., always or consistently) be in a forward flight mode or configuration. For example, in this region, the blade would be in the blade position shown in diagram 116 in FIG. 1.

In undefined region 204, the position of the blades is not known. The blades could, for example, be in the first blade position (e.g., pinned against stopper 114 as shown in diagram 112 in FIG. 1), the second blade position (e.g., held against magnet 114 as shown in diagram 116 in FIG. 1), or at some blade position between the two (e.g., dangling and not in a stable or "firm" position). Therefore, to ensure that the blades are in a known position, the aircraft is operated in hover mode envelope 202 or forward flight mode envelope 206.

To switch the blades from hover mode to forward flight mode, the propeller is slowed down to an RPM (and forward flight speed) that falls within the forward flight mode envelope (206). For example, the propeller is slowed down to go from $(RPM_1, v_{forward,1})$ to $(RPM_2, v_{forward,1})$. Although in this example the forward velocity stays the same when the propeller is slowed down, in some other cases the forward velocity changes (e.g., slows) in response to the change in propeller rotational speed. The blades are still able to switch to a forward flight configuration so long as the end data point falls within the forward flight mode envelope (206).

To switch the blades from forward flight mode to hover mode, the propeller is sped up to an RPM (and forward flight speed) that falls within the hover mode envelope (202). For example, the propeller is sped up from $(RPM_2, v_{forward,2})$ to $(RPM_1, v_{forward,2})$. As described above, although the forward speed remains the same in this example during the transition, in some other cases the forward speed may change in response to the propeller being sped up and this is acceptable so long as the end data point falls within hover mode envelope 202.

In this example, the propeller is sped up and slowed down during the transition with some margin such that the end data point does not fall on border 208 or on border 210. In some embodiments, the same RPM is used (e.g., regardless of the forward velocity of the aircraft) when the blades are switch from forward flight mode to hover mode (or vice versa). For example, in diagram 200, this would mean always spinning up the propeller to $RPM_1$ when putting the blades into a hover configuration (e.g., regardless of forward velocity) and always spinning down the propeller to $RPM_2$ when putting the blades into a forward flight configuration (e.g., regardless of forward velocity). In some applications this is attractive because it is an easy-to-implement design.

Alternatively, the propeller may be spun up or down until the RPM and forward velocity reach a point in the hover mode envelope or forward flight mode envelope (e.g., with some margin, if desired). For example, to transition the blades from hover mode to forward flight mode, the propeller may be spun down a little and the forward velocity may be measured. If that data point (e.g., the combination of the new, slower RPM and the measured forward flight) is in the forward flight mode envelope (e.g., with sufficient margin, if desired), then the switch has completed and the process ends. If not, the propeller is slowed down some more, the forward velocity is measured again, and another check is performed. In some applications this approach is attractive because the propeller does not need to be spun up/down unnecessarily in order to switch the blade position (e.g., which may produce a less jerky and/or smoother flight experience).

Naturally, once the blades have changed position, the propeller may be rotated at any desired speed (e.g., so long as it is within the appropriate envelope, otherwise the blades will switch position again). For example, when the blades switch position, the propeller may be spun up or slowed down briefly and then the propeller is returned to some operational or desired rotational speed.

The following figure more formally describes the various states associated with rotating the propeller in various envelopes in order to "pin" the blades of the propeller into one of two (stable) positions.

Figure 3:
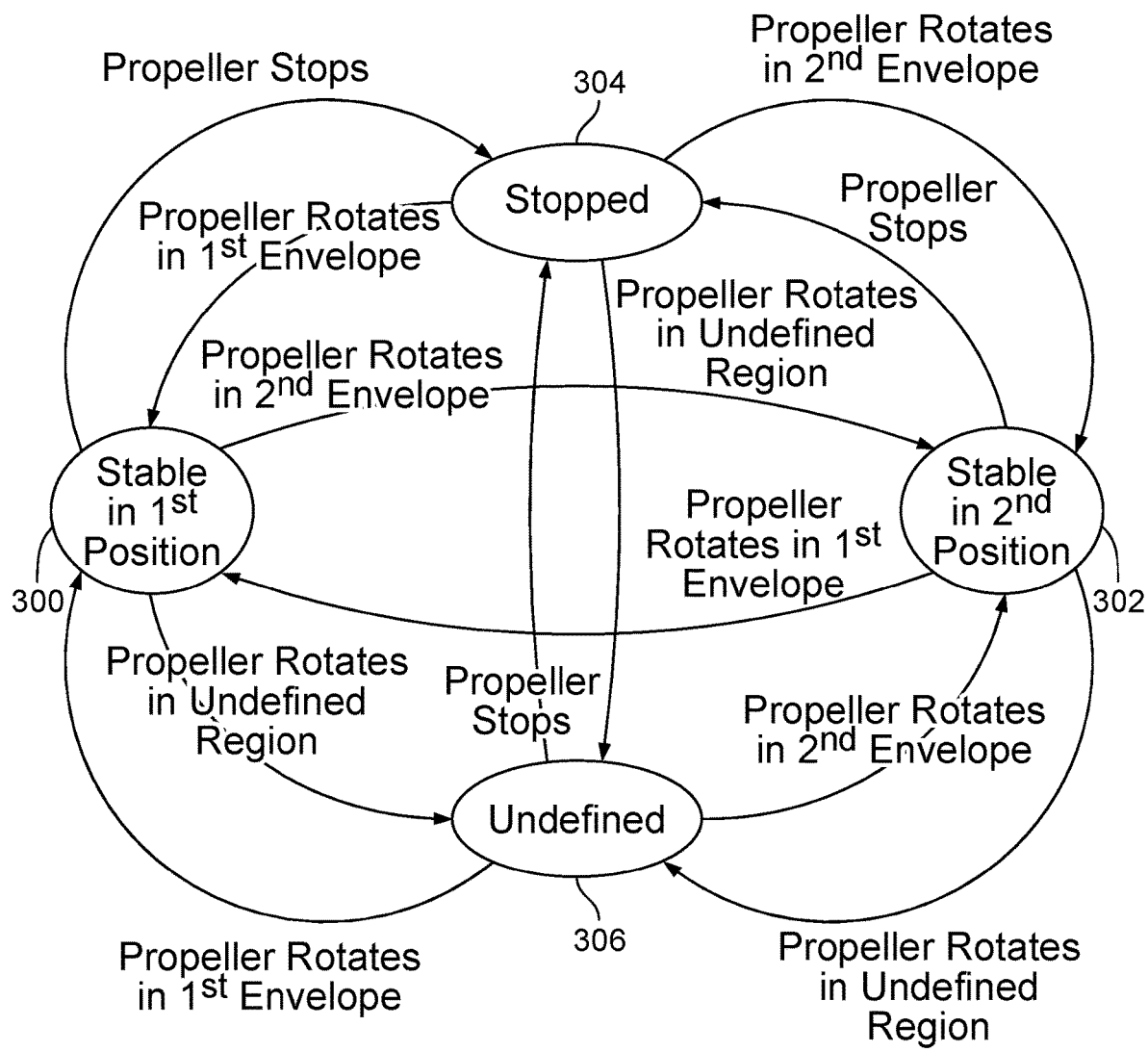
FIG. 3 is a state diagram illustrating an embodiment of states associated with a bistable pitch propeller.

FIG. 3 is a state diagram illustrating an embodiment of states associated with a bistable pitch propeller. FIG. 3 continues the example of FIG. 2 where there is a forward flight mode envelope, a hovering mode envelop, and an undefined region. In some embodiments, the propeller instructions (e.g., stop, rotate at a particular speed in a particular envelope, etc.) issued by a flight computer (e.g., implemented using a processor and memory) cause a bistable pitch propeller to go through the states shown.

In state 300, a bistable pitch propeller is stable in a first position. To get into this state, a propeller, which includes a rotatable blade, is rotated at a speed which falls into a first envelope (see, e.g., hover mode envelope 202 in FIG. 2). The rotation of the propeller in this region causes the rotatable blade to be in a first blade position. For example, as is shown in FIG. 1, a blade may be able to rotate because it is connected to a bearing which is able to rotate. In diagram 112 in FIG. 1, the rotation of the propeller causes an aerodynamic force (as an example) to push the blade (102) against the stopper (114), holding blade (102) in the first blade position shown therein. In that example, the blade pitch shown (i.e., $\alpha_1$) is good for hovering, so (as an example) a propeller may be put into state 300 when the aircraft is hovering or is transitioning to hovering.

In state 302, the bistable pitch propeller is stable in a second state. To get into this state, the propeller is rotated at a speed which falls into a second envelope (see, e.g., or forward flight mode envelope 206 in FIG. 2). The rotation of the propeller in this region causes the rotatable blade to be in a second blade position different from the first blade position. See, for example, diagram 116 in FIG. 1 which shows the blade (102) in a second blade position. As is shown in FIG. 1, the different blade positions include different blade pitches where $\alpha_1 \neq \alpha_2$. The blade position in this diagram is better for forward flight and so (as an example) a propeller may be put into state 302 when the aircraft is in forward flight or is transitioning to forward flight.

When the bistable pitch propeller stops, the propeller goes into the stopped state (304). The actual position of the propeller's blades in the stopped state may depend upon what position the blade was in before the propeller stopped. For example, if the blade was positioned against the magnetic stop, then the magnetic force from the magnetic stop will continue to pull against the blade, holding it in position even after the propeller stops.

If the propeller is operated in the undefined region, the propeller goes into the undefined state (306). As described above, the blade may be in the first blade position (e.g., an angle which is good or better for hovering), the second blade position (e.g., an angle which is good or better for forward flight), or some in-between position.

The following figure illustrates an example of an aircraft which uses a bistable pitch propeller. Naturally, the aircraft shown is merely exemplary and is not intended to be limiting.

FIG. 4 is a diagram illustrating an embodiment of an octocopter which includes bistable pitch propellers. In this example, all of the octocopter's propellers are bistable pitch propellers. Naturally, some other types of aircraft may be configured differently.

Diagram 400 shows a top view of the octocopter. Diagram 402 shows a side view of the octocopter when the octocopter is in a hovering position. From this view, it is apparent that the plane of the octocopter (e.g., created by the four crossbars (404) to which the eight propellers are attached) is horizontal when hovering. In this mode, it is desirable for the propellers to be optimized for hovering, and the propellers may be rotated at a speed which causes the bistable pitch propellers to have their blades be in a position which is optimized for hovering.

To transition from hovering to forward flight, the octocopter "flips up" so that the plane created by the crossbars (404) is vertical. For example, diagram 406 shows a side view of the octocopter in a transitional position where the plane created by the crossbars is at a diagonal. Diagram 408 shows a side view of the octocopter in forward flight, where the plane created by the crossbars is in a vertical position. In some embodiments, the octocopter flips up by selectively spinning the propellers at different rotational speeds to create a lift differential (e.g., the propellers are fixed to the crossbars and they cannot be angled or repositioned). This lift differential causes one side of the octocopter to flip up (e.g., the left side from the side views shown in diagrams 402, 406, and 408.

It is noted that the position or mode of the octocopter and propellers are independent and the octocopter can be in one mode (e.g., forward flight) while the propeller is in the other mode (e.g., hovering). For example, in the sequence of diagram 402 to diagram 406 to diagram 408, the propellers may not be switched from hovering mode to forward flight mode until the octocopter has flipped up to a forward flight position (see diagram 408). The blades of the propellers would therefore temporarily be at an angle that better suited to hovering while the octocopter is in forward flight position (e.g., at least until the blades of the propellers were switched to the more efficient forward flight mode). Although the performance may not be optimal (e.g., it may be noisy or not as efficient), it may still be acceptable.

The following figures illustrate an example of a bistable pitch propeller system with mechanical components to ensure that the blades are in the same position at the same time. For example, if one blade is in one position (e.g., hovering mode) and the other blade is in another position (e.g., forward flight mode), the propeller may experience a significant amount of vibration. The exemplary bistable pitch propeller system described below prevents this from occurring.

FIG. 5A is a diagram showing an embodiment of a bistable pitch propeller with mechanical components to ensure that the two blades are in the same position at the same time. Diagram 500 shows a side view of the exemplary bistable pitch propeller where both the first blade (502) and the second blade (504) are shown. In both diagram 500 and diagram 506, the first blade (502) and the second blade (504) are both in a first (e.g., hovering) blade position. In one example, the blade positions shown here are associated with hovering mode envelope 202 shown in FIG. 2. As shown in diagram 500, there is a difference of ~20° between the first blade position (shown in diagram 500) and the second blade position (e.g., when the second blade is held against magnet 510).

Diagram 506 shows a cutaway view without the first blade (502) which better shows the inner mechanical components. As shown in diagram 506, peg 506 prevents part 508 from moving any further and thus second blade is held in a mechanically stable position. As described above, an aerodynamic force causes the second blade (504) to rotate, in this diagram pushing part 508 into peg 506. For convenience, the blade position shown in diagram 500 and diagram 506 is referred to herein as the first blade position.

Suppose that the bistable pitch propeller is rotated at a speed and has a forward velocity that falls in the other flight envelope. This would cause the blades flip to the second blade position such that part 512 (e.g., part of or connected to second blade 504) is stopped by magnet 510. When the blades are held against the magnet (not shown), the blades are in a stable position; this is an example of a second blade position.

The bistable pitch propeller embodiment shown here includes mechanical components to ensure that first blade and the second blade are both in the same blade position at the same time. For example, suppose that the second blade (504) in diagram 506 rotates so that peg 506 and part 508 separate and magnet 510 and part 512 move closer to each other. The tip of part 508 is long enough to touch the back of part 514 if the first blade (not shown in diagram 506) remains in the first blade position. Thus, if the first blade somehow got stuck in the first blade position, part 508 from the second blade would push the first blade into the second blade position. This would prevent the first blade (502) from being in the first blade position while the second blade (504) switched to the second blade position. In general, the exemplary bistable pitch propeller has components which force the two blades to be in the same blade position, preventing the blades from being in different blade positions.

Figure 5B:
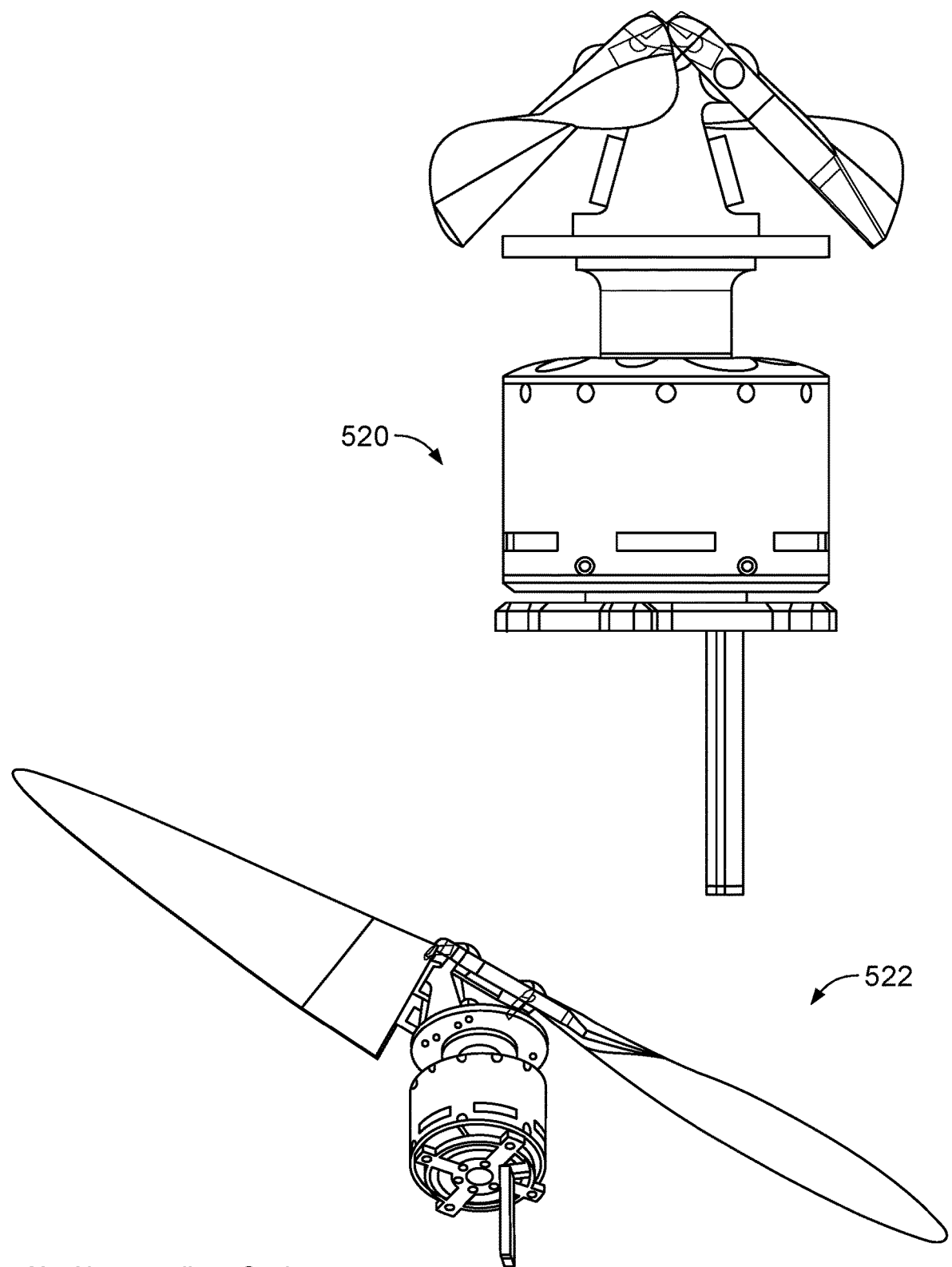
FIG. 5B is a diagram showing a side view without blades and a side view looking up of the exemplary bistable pitch propeller with mechanical components to ensure that the blades are in the same position.
Figure 5C:
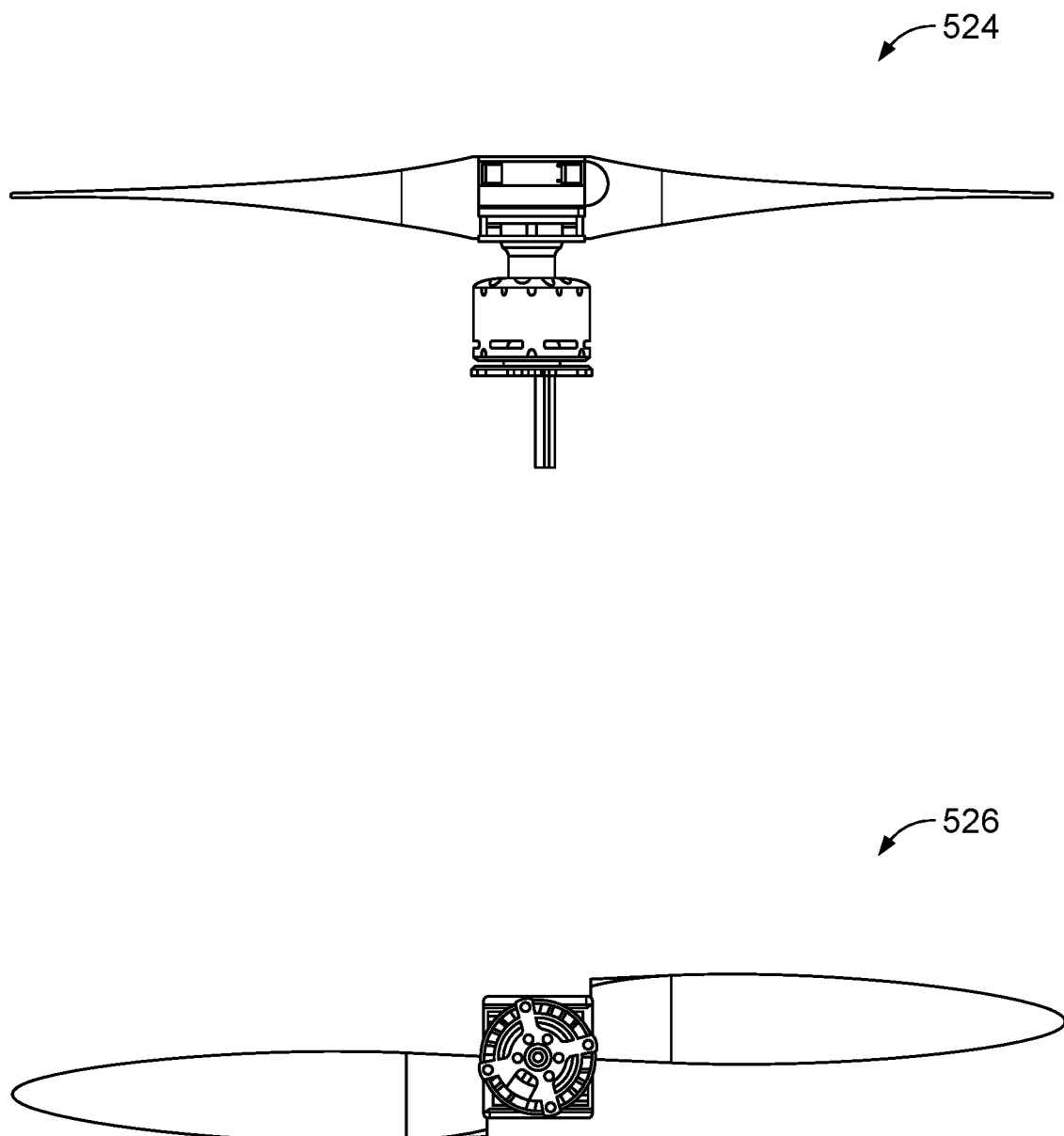
FIG. 5C is a diagram showing a side view with blades and a bottom view of the exemplary bistable pitch propeller with mechanical components to ensure that the blades are in the same position.

FIGS. 5B and 5C show additional views of the exemplary bistable pitch propeller with mechanical components to ensure that the blades are in the same position. Diagram 520 shows a side view without blades, diagram 522 shows a side view looking up, diagram 524 shows a side view with blades, and diagram 526 shows a bottom view.

As described above, if the blades of a propeller are at different angles, there may be a significant amount of vibration. In some embodiments, the following process is used to (e.g., automatically) detect when this occurs and force the blades into the same blade position.

Figure 6:
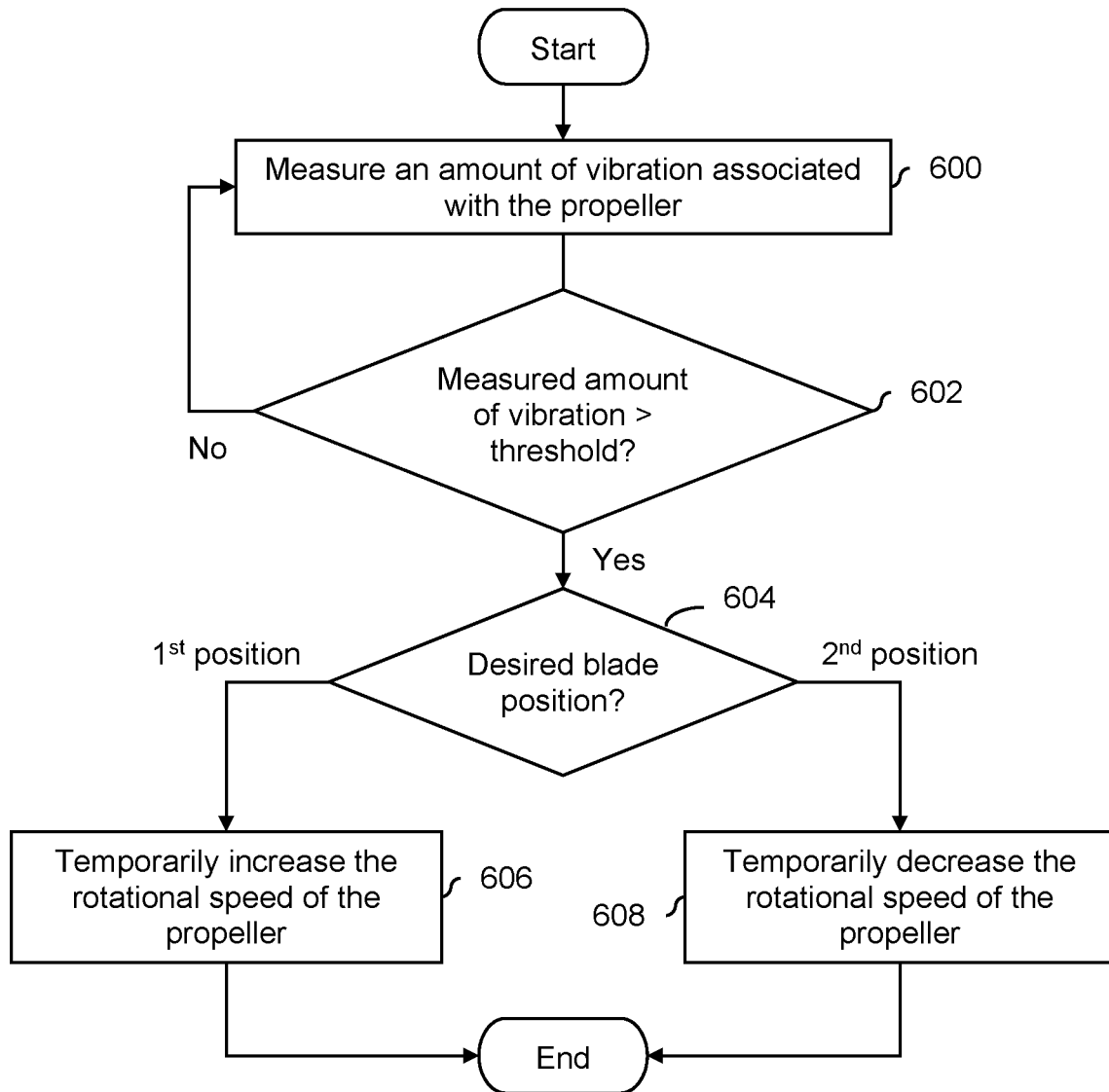
FIG. 6 is a flowchart illustrating an embodiment of a process to automatically detect when there is a significant amount of vibration in a bistable pitch propeller.

FIG. 6 is a flowchart illustrating an embodiment of a process to automatically detect when there is a significant amount of vibration in a bistable pitch propeller. For example, the process may be used with embodiments of the bistable pitch propeller where there are no components to ensure that the two blades are at the same blade angle.

At 600, an amount of vibration associated with the bistable pitch propeller is measured. As shown in FIG. 4, an aircraft may have multiple propellers and so in some embodiments there is a vibration sensor for each bistable pitch propeller.

At 602 it is determined if the measured amount of vibration is greater than a threshold. For example, there may be some expected or normal degree of vibration and the threshold is set to some value well beyond that.

If the measured amount of vibration is determined to be less than the threshold at 602, the process continues to measure the amount of vibration at step 600. If the measured amount of vibration is determined to be greater than the threshold at 602, a desired blade position is determined. In some embodiments, the desired blade position is the last blade position or angle the bistable pitch propeller was put into (e.g., a last programmed position). For example, if a given bistable pitch propeller was put into a hovering mode and then one of the blades inadvertently switched to a forward flight position or angle, the desired blade position would be the hovering mode or angle.

If it is determined at step 604 that the desired blade position is the first position, then at 606 the rotational speed of the propeller is temporarily increased. For example, it may be a relatively high speed well above some a borderline speed to ensure that the blades are forced into the first position.

If it is determined at step 604 that the desired blade position is the second position, then at 608 the rotational speed of the propeller is temporarily decreased. For example, it may be a relatively low speed well below some a borderline speed to ensure that the blades are forced into the second position.

After step 606 or 608, the propeller may be returned to its previous rotational speed. In some embodiments, the vibration of that propeller is measured again (e.g., at step 600) and compared against a threshold again (e.g., at step 602) to ensure the blades were forced into the same position or angle. If not, the process may be repeated again.

In some embodiments, if multiple propellers are experiencing a significant amount of vibration, the process tries to fix one propeller at a time. For example, the aircraft may be unstable if too many propellers are sped up very quickly or slowed down very quickly at the same time.

In some embodiments, it is easier to put the bistable pitch propeller into one mode or position compared to the other. For example, it may be easier to push a blade against a magnetic stop than to make a blade break free from the magnetic field of a magnetic stop. In some embodiments, blade is first put into this position (e.g., to quickly stop the excessive vibration). For example, this may occur before step 606 or step 608. Then, the process may try to put the propeller into the desired blade position (e.g., by performing step 606 or step 608).

As described above, a variety of stoppers may be employed for the mechanical and/or magnetic stopper and the stopper shown in FIG. 1 is merely one example. The following figures illustrate some other examples.

FIG. 7A is a diagram illustrating an embodiment of a peg stopper which stops a peg connected to a bearing. In the example shown, diagram 700 shows a side view when the blade is stopped by the exemplary peg stopper; for clarity only a single stopper is shown. In this example, a cross section of the blade (e.g., looking towards the nose piece from the tip of the blade) is shown with a dashed line (701), where the blade is attached to the bearing (e.g., extended out of the page). In order to clearly show the peg and peg stopper, the blade cross section shown in this figure is transparent. The longitudinal axis of rotation of the blade (also not shown) extends out of the page from the center of the bearing (702). The aerodynamic center of the blade (also not shown) is at a height below the height of the axis of rotation of the blade. This permits the bottom portion of the blade to be pushed by an aerodynamic force either towards the peg stopper.

As in the above example(s), bearing 702 is able to rotate. When the bistable pitch propeller is rotated at a particular speed within some flight envelope, an aerodynamic force pushes on the blade, which causes the blade and the bearing to rotate towards the peg stopper (706). A peg (704) is attached to and radiates outward from the bearing (702) and the bearing rotates until the peg is stopped by the peg stopper (706). In this example, the peg stopper is connected to the nose piece (712) so that the peg stopper can stop the peg from moving further, even while the propeller rotates.

To achieve a desired blade position, a peg stopper is attached to the nose piece to stop the peg at the appropriate position (e.g., to achieve a steeper blade angle or a more feathered blade angle). The blade position or pitch shown here is merely exemplary and is not intended to be limiting. Some examples are described below where the position of a stopper is adjustable so that the first blade position and/or second blade position is/are not necessarily fixed (e.g., the peg stoppers are not welded directly to the nose piece, which would cause them to remain in a fixed position).

Although the peg and bearing are shown here with a seam (e.g., from welding or otherwise attaching the peg and bearing together), the peg and bearing may comprise a single piece of metal or other material (e.g., the peg and bearing are cast or cut as a single piece of metal). In various embodiments, a peg and/or a peg stopper may comprise a variety of shapes and/or materials. For example, a peg stopper may be made of metal (e.g., for strength and/or durability) and have a rubber sleeve or cover (e.g., to cushion the peg which may be pushed forcefully into the peg stopper, given the expected high propeller speeds). In some embodiments, a peg stopper has substantially the same height as a peg (e.g., to increase the area where the peg and peg stopper come into contact which better distributes the pressure and/or to more securely attach the peg stopper to the nose piece). In some embodiments, the peg and peg stopper have matching surfaces where they come into contact with each other (e.g., both have a flat surface where they make contact and the flat surfaces match up) to increase the area where they come into contact with each other.

The following figure shows a different embodiment where a stopper is designed to come into direct contact with the blade (e.g., as opposed to this figure).

FIG. 7B is a diagram illustrating an embodiment of a blade stopper which is designed to come into contact with and stop a blade. In the example shown, diagram 720 shows a side view when the blade is stopped by the exemplary blade stopper; for clarity only a single stopper is shown. An aerodynamic force pushes against the blade (722), causing the bearing (724) which is attached to the blade to rotate. The rotation of the blade and bearing is stopped when one (e.g., substantially flat) side of the blade (726) comes into contact with a blade stopper (728); this holds the blade in a first blade position when the propeller is rotating in the direction shown.

Diagram 732 shows a top view; for clarity, the blade is not shown. As is shown in this view, the blade stopper (728) is attached to the nose piece (730), radiating outward so that it can make contact with the blade (not shown).

For clarity, the exemplary blade cross section shown here has a relatively simple design or shape but this is not intended to be limiting. A blade used in a real-world embodiment may have a design or shape which is optimized to achieve a variety of design and/or performance objectives.

In various embodiments, the shape and/or materials(s) of a blade stopper may vary. For example, the shape of the blade stoppers may be aerodynamic since the propeller is expected to have a relatively high rate of rotation. In some embodiments, a blade stopper is made of metal with a rubber sleeve or cover.

As described above, in some embodiments, the position of a stopper is adjustable, such that the first blade position and/or the second blade position is adjustable. The following figure illustrates some examples of adjustable stoppers.

FIG. 8 is a diagram illustrating some embodiments of adjustable stoppers. For clarity only a single adjustable stopper is shown in each diagram. Diagram 800 shows a side view of an adjustable peg stopper. In this example, the position of the peg stopper (802) can be positioned anywhere within the cutout (804). By adjusting the position of a peg stopper within a cutout, the blade position (e.g., when the peg is stopped by the peg stopper) can be varied. Naturally, the shape of the cutout (in this example, circular) is merely exemplary and is not intended to be limiting. In some other embodiments, the cutout is L-shaped, vertical, horizontal, diagonal, etc.

In various embodiments, a variety of adjustment mechanisms may be used in diagram 800. In one example, the peg stoppers are designed to be manually adjusted, for example, using an exposed knob or using a screwdriver to turn an exposed screw head. Turning the screw head or knob in turn causes a corresponding peg stopper to move (for example) clockwise/counterclockwise, up/down, left/right within a cutout.

In some embodiments, the nose piece (810) includes actuators which permit the automatic (that is, non-manual) adjustment of the first and/or second peg stoppers within the first and second cutouts, respectively. In one example, when the propeller is not rotating or when the peg (812) is stopped by the first peg stopper, the second peg stopper can be moved within the second cutout using the appropriate actuator. Then, when the propeller is rotated in the other direction, the new position of the second peg stopper will cause the blade to stop in a new, second blade position. This permits the propeller to go through a sequence of three or more blade positions between takeoff and landing (e.g., (1) rotate propeller clockwise and blade pitch=$\alpha_1$, (2) rotate propeller counterclockwise and blade pitch=$\alpha_2$, (3) adjust first peg stopper, (4) rotate propeller clockwise and blade pitch=$\alpha_3$, etc.). Some examples of user interfaces associated with setting a blade position and/or stopper position are described in more detail below.

Diagram 814 illustrates a side view of an example of an L-shaped, telescoping blade stopper. In this example, the blade stopper (816) is telescoping, which permits the length of the blade stopper to be adjusted. This, in turn, stops the blade at varying blade positions or blade pitches when the propeller is rotated in the appropriate direction. Since a blade will come into contact with a telescoping blade stopper at a variety of angles (e.g., depending upon the height of the stopper), a telescoping blade stopper has rounded ends where the stopper comes into contact with a side of the blade. In some embodiments, some other tip shape is used. In some embodiments, the end or tip of a telescoping blade stopper is rubberized.

As described above, a variety of mechanisms (e.g., manual adjustment using screw(s) and/or knob(s) or automatic adjustment using actuators) may be used to adjust the height of the telescoping blade stoppers. As described above, in some embodiments the adjustment mechanism is a manual adjustment mechanism and in other embodiments the adjustment mechanism is an automatic adjustment mechanism.

The ability to adjust the first and/or second blade position may be especially desirable in wind turbine applications. In wind turbine applications, the pitch of the blade is adjusted depending upon wind strength. When the wind is too strong and too much electricity is being generated, the pitch of the blade is adjusted so that the blades are more feathered, reducing the amount of electricity produced. If the wind dies down too much, then the pitch of the blade may be adjusted so that the blades are at a steeper angle, increasing the amount of electricity produced.

In some embodiments, the blades of a bistable pitch propeller are configured to return to a certain position when the propeller is not rotating. The following figure shows one such example.

FIG. 9 is a diagram illustrating an embodiment of a bistable pitch propeller, where the blades are configured to return to a resting position when the propeller is not rotating. In this example, the resting position is a feathered position.

In the example shown, diagram 900 shows the nose piece (902) with two internal springs (904a and 904b). When the propeller is not rotating, there is no aerodynamic force which pushes down the blade (906) towards either the mechanical stop or the magnetic stop (not shown). The first internal spring and second internal spring therefore collectively push the blade to the center (i.e., a feathered position). In this example, the internal springs are relatively weak such that when the propeller is rotating, the expected aerodynamic force is greater than the force exerted by the internal springs and the blades can be pushed and held in the first or second blade position.

Diagram 910 shows an interior view of the nose piece. In this diagram, part of the bearing (not shown in diagram 910) is connected to a spring-mounted ball bearing (914). It is noted that the spring-mounted ball bearing (914) is different from bearing 912. When the blade is in the first blade position because of the first peg stopper, the spring-mounted ball bearing is in position 916. When the blade is in the second blade position because of the second peg stopper, the spring-mounted ball bearing is in position 918. When the propeller is not rotating there is no aerodynamic force pushing against the blade and so the internal springs shown in diagram 900, as well as the sloped surface, will cause the spring-mounted ball bearing to come to a rest in position 620 (i.e., the resting, feathered position when the propeller is not rotating). The placement of the "dip" or minima in the sloped surface therefore dictates where the resting position will be. In this example, the slope(s) (e.g., between positions 916, 920, and 918) is/are relatively shallow and the springs are relatively weak. This permits the expected aerodynamic force to push the blade (e.g., at rest) out of the resting position shown and into the first or second blade position when the propeller is rotating.

Naturally, the mechanisms shown here which cause the blade to go to a resting position (in this example, a feathered position) when the propeller is not rotating are merely exemplary and are not intended to be limiting. Any (e.g., mechanical) mechanism which returns the blade to some desired resting position when the propeller is not rotating may be used.

In some cases, it may be desirable to have the feathered blade position shown here be one of the blade positions created or defined by a stopper. The following figure shows an example of this.

FIG. 10 is a diagram illustrating an embodiment of a blade being held in a feathered blade position using a peg stopper. In the example shown, a peg stopper embodiment is shown, but naturally the concepts may be extended to other embodiments. As described above, a bearing (1000) which is able to rotate has a peg (1002) attached to it. When the propeller is rotated, an aerodynamic force pushes the blade (1004) until the peg comes up against the peg stopper (1006) where the peg stopper is connected to the nose piece (1008). This causes the blade to be held at a feathered blade position where $\alpha_3=90°$. For example, if the bistable pitch propeller is being used in a wind turbine application, then it may be desirable to have one of the blade positions defined or created by a stopper be a feathered blade position. The blades may be put into this position when the wind is too strong (e.g., there is a storm) and too much electricity is being generated.

As is shown in FIG. 5, the position of a stopper (and thus a blade position when a bistable pitch propeller is rotating) is adjustable in some embodiments. The following figure illustrates some example user interfaces which may be presented to a pilot or user when there is an automatic adjustment mechanism (e.g., as opposed to a manual adjustment).

Figure 11:
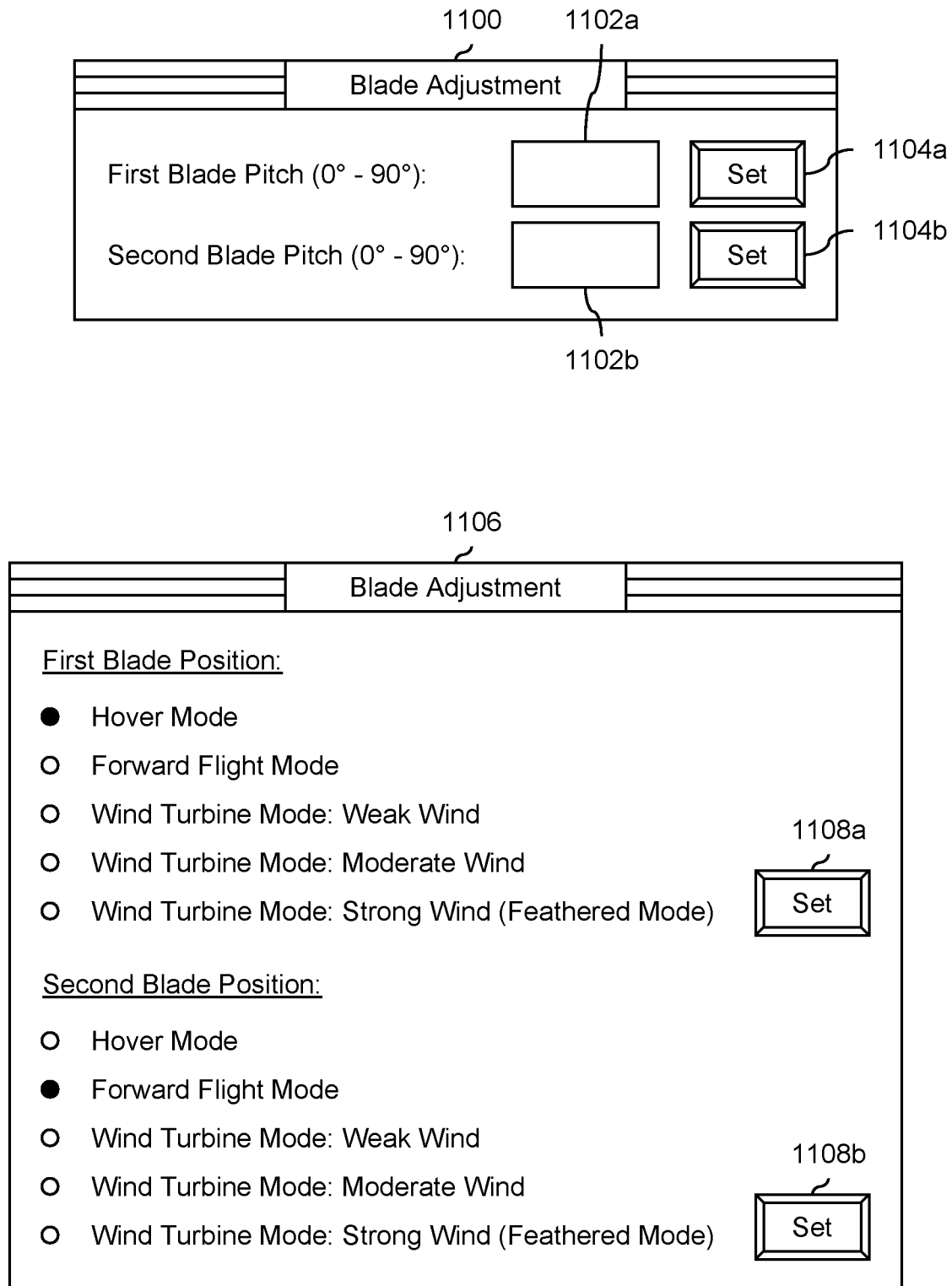
FIG. 11 is a flowchart illustrating various embodiments of user interfaces associated with adjusting the position of a blade.

FIG. 11 is a flowchart illustrating various embodiments of user interfaces associated with adjusting the position of a blade. In some embodiments, the user interface is presented to a pilot or other user by a flight computer (e.g., implemented using a processor and memory) when a stopper has an automatic adjustment mechanism.

User interface 1100 shows an example of a user interface where the pilot or user is permitted to specify the desired blade pitches (e.g., explicitly). To change or otherwise set the first blade pitch, the user can input a number (in this example, between 0° and 90° in input box 1102a and press the set button (1104a). The flight computer then moves the corresponding adjustable stopper (see, for example, FIG. 8) to a position which corresponds to the specified blade pitch. Similarly, a desired blade pitch can be specified for the second blade pitch using input box 1102b and set button 1104b.

User interface 1106 shows an example of a user interface where the pilot or user selects a flight mode from a plurality of presented flight modes. In this example, user interface 1106 permits the pilot or user to select a hover mode, a forward flight mode, a wind turbine mode when the wind is weak, a wind turbine mode when the wind is moderate, or a wind turbine mode when the wind is strong (i.e., a feathered mode). To set the first blade position, the desired mode is selected by clicking on the appropriate radio button and set button 1108a is pressed. Similarly, the second blade position can be set or otherwise adjusted by selecting the desired mode and pressing set button 1108b. Each flight mode may have a corresponding stopper position (e.g., corresponding to a blade pitch which is optimized for that particular mode or application) and the appropriate stopper is moved to that stopper position.

As described above, in some embodiments an aircraft includes multiple bistable pitch propellers. See, for example, FIG. 4. In such embodiments, the user interface may include independent controls for each bistable pitch propeller.

In some embodiments, a given stopper can only be adjusted at certain times (e.g., when the propeller is not rotating or when the blade is being held in position by the other stopper). If so, this may be handled by the user interface in a variety of ways in various embodiments. In some embodiments, the user interface does not permit the pilot or user to specify a desired blade pitch or desired mode when a given stopper cannot be adjusted. For example, in user interface 1100 and user interface 1106, the affected input box, radio buttons, and/or set button may be disabled and the user may not be able to select those controls and/or input values into those controls. In some other embodiments, the pilot or user is able to specify a desired blade pitch or desired flight mode at any time, but the user interface informs the pilot or user that the change will not be made right away. When the appropriate stopper is able to be adjusted (e.g., because the blade flips over to the other stopper or the propeller stops rotating), the user interface may be updated to inform the pilot or user that the change has been made.

The following figures more formally describe how information received from a user interface may be used to change the position of an adjustable stopper. For brevity, only processes relating to mechanical stops are shown but naturally the techniques may be applied to magnetic stops.

Figure 12A:
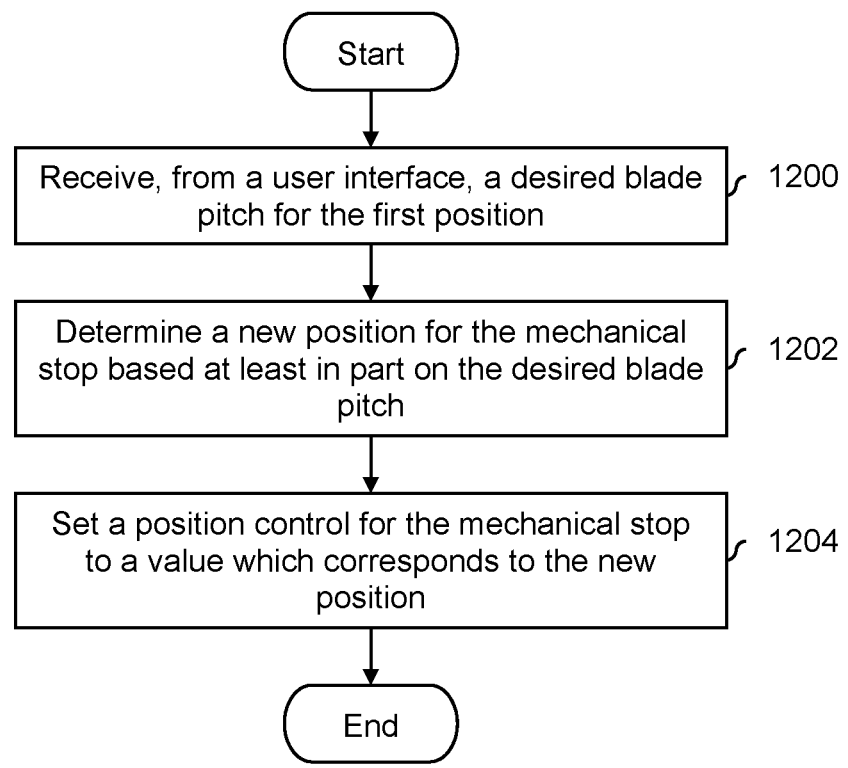
FIG. 12A is a flowchart illustrating an embodiment of a process to receive a desired blade pitch from a user interface and adjust the position of a mechanical stop accordingly.

FIG. 12A is a flowchart illustrating an embodiment of a process to receive a desired blade pitch from a user interface and adjust the position of a mechanical stop accordingly. At 1200, a desired blade pitch for the first position is received from a user interface. See, for example, user interface 800 in FIG. 8. At 1202, a new position for the mechanical stop is determined based at least in part on the desired blade pitch. For example, there may be some lookup table which maps the desired blade pitch to a corresponding position of the stopper. At 1204, a position control for the mechanical stop is set to a value which corresponds to the new position. For example, a control for an actuator may be set to some value which causes the stopper to be moved to the new position determined at step 1202.

Figure 12B:
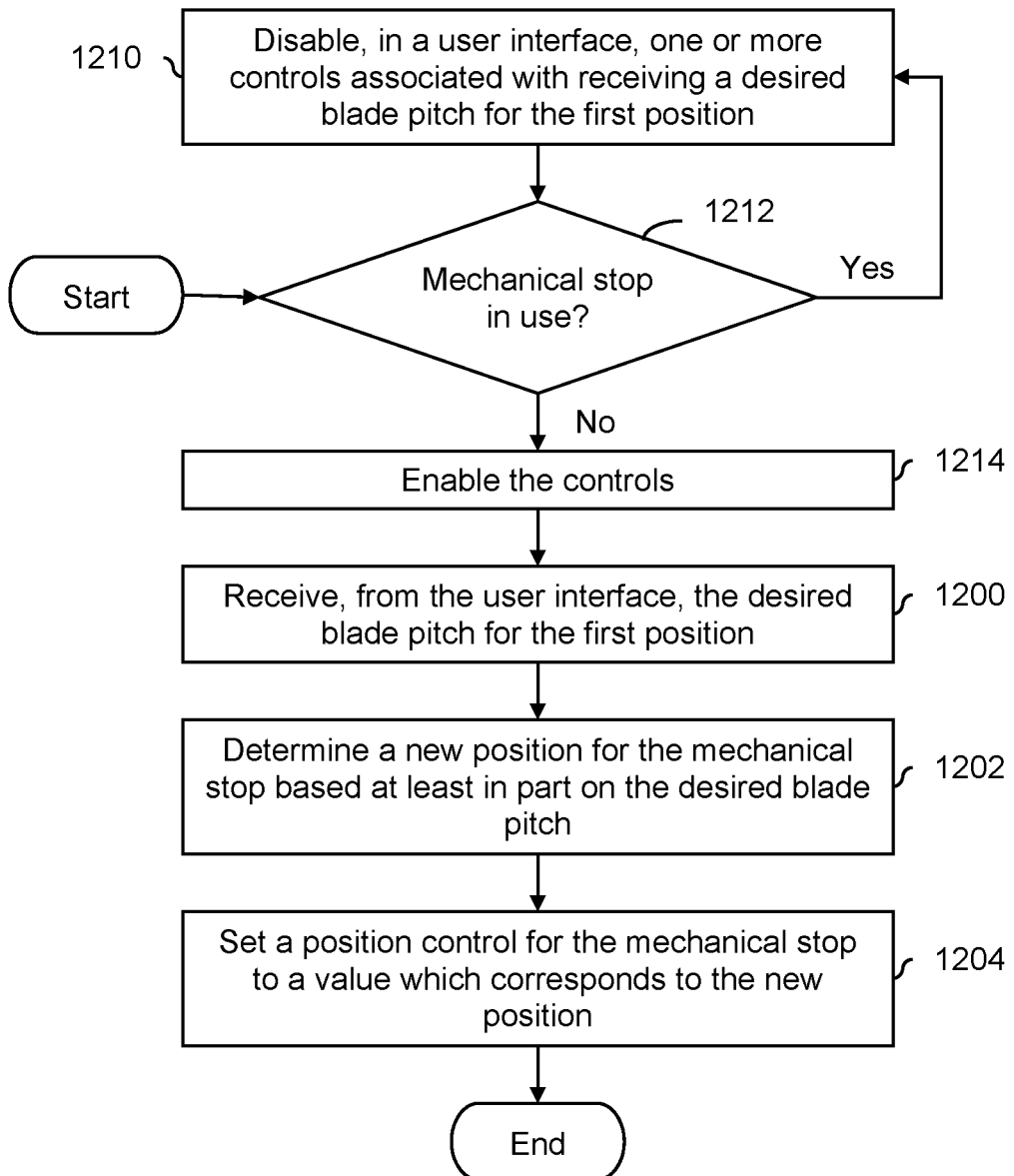
FIG. 12B is a flowchart illustrating an embodiment of a process to receive a desired blade pitch from a user interface and adjust the position of a mechanical stop accordingly where the user interface is disabled if the mechanical stop is in use.

FIG. 12B is a flowchart illustrating an embodiment of a process to receive a desired blade pitch from a user interface and adjust the position of a mechanical stop accordingly where the user interface is disabled if the mechanical stop is in use. For brevity, steps that are similar to those described above (e.g., identified by identical reference numbers) are not discussed in detail here.

At 1212, it is determined if a mechanical stop is in use. For example, as described above, the mechanical stop may only be permitted to be moved if the propeller is not rotating or the magnetic stopper is the one currently holding the blade or peg in place.

If it is determined that the mechanical stop is in use at 1212, then one or more controls associated with receiving a desired blade pitch for the first position are disabled in a user interface 1210. For example, in user interface 1100 in FIG. 11, a user would not be able to select and/or input values into input box 1102a or set button 1104a if the mechanical stop is holding the blade in the first blade position or pitch. Similarly, in user interface 1106, the radio buttons and set button 1108a may be disabled (e.g., un-selectable) if the mechanical stop is holding the blade in the first blade position or pitch. In this example, the process stays in this loop until the mechanical stop is no longer in use.

Once (or if) the mechanical stopper is determined to not be in use at step 1212, the controls are enabled at 1214. This, for example, permits the user to select the previously disabled controls. At 1200, the desired blade pitch for the first position is received from the user interface. At 1202, a new position is determined for the mechanical stop based at least in part on the desired blade pitch. At 1204, a position control for the mechanical stop is set to a value which corresponds to the new position.

Figure 12C:
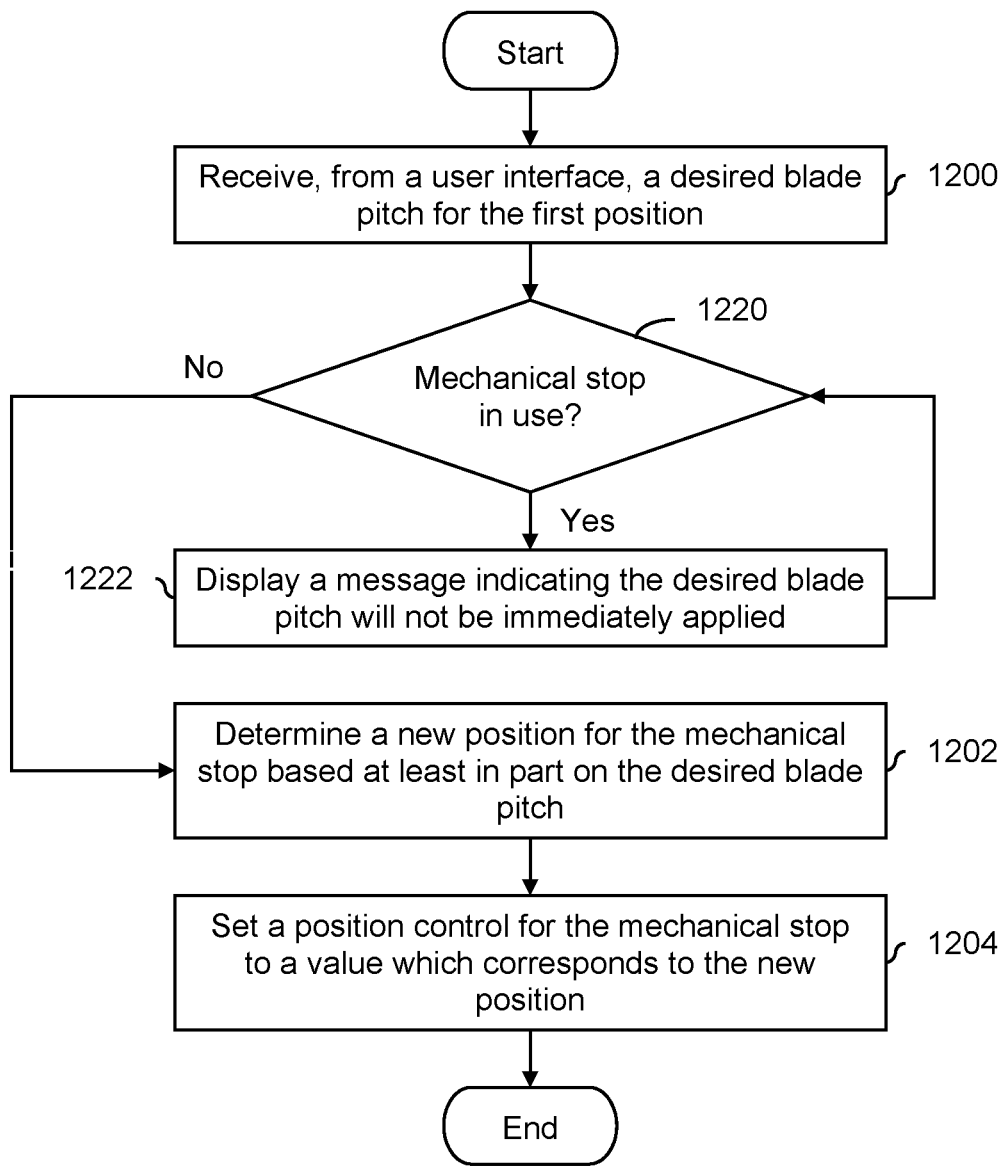
FIG. 12C is a flowchart illustrating an embodiment of a process to receive a desired blade pitch from a user interface and adjust the position of a mechanical stop accordingly where the desired blade pitch is held until the mechanical stop is free.

FIG. 12C is a flowchart illustrating an embodiment of a process to receive a desired blade pitch from a user interface and adjust the position of a mechanical stop accordingly where the desired blade pitch is held until the mechanical stop is free. As before, steps previously described are not discussed in detail here for brevity.

At 1200, a desired blade pitch for the first position is received from a user interface. At 1220, it is determined if a mechanical stop is in use.

If the mechanical stop is determined to be in use at 1220, a message indicating that the desired blade pitch will not be immediately applied is displayed at 1222. In this example, the process stays in this loop until the mechanical stop is no longer in use. In this embodiment, the user interface permits a desired blade pitch to be specified or otherwise input, but then holds on to that pitch without actually making any changes until the relevant mechanical stop is no longer being used to hold or otherwise stop the blade or peg (as an example). In various embodiments, the content of a message displayed at step 1222 may vary. In some embodiments, the message is fairly simple (e.g., "Waiting"). In some embodiments, the message identifies that the wait is due to the stopper being in use (e.g., "The blade pitch will be changed when the propeller is turned off or the propeller switches directions.").

Once (or if) the mechanical stop is determined to not be in use at 1220, a new position for the mechanical stop is determined based at least in part on the desired blade pitch at 1202. In some embodiments, a second message is displayed to the user, indicating that the desired blade pitch has been applied (e.g., "Done" or "The blade pitch has been changed").

At 1204, a position control for the mechanical stop is set to a value which corresponds to the new position.

Figure 13A:
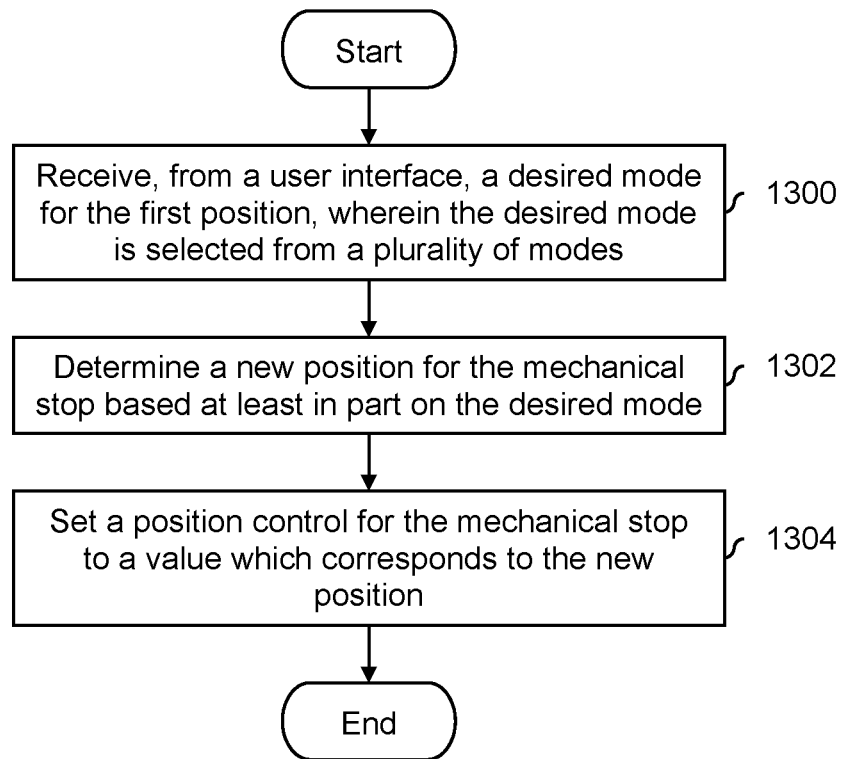
FIG. 13A is a flowchart illustrating an embodiment of a process to receive a desired mode from a user interface and adjust the position of a mechanical stop accordingly.

FIG. 13A is a flowchart illustrating an embodiment of a process to receive a desired mode from a user interface and adjust the position of a mechanical stop accordingly. At 1300, a desired mode for the first position is received from a user interface, wherein the desired mode is selected from a plurality of modes. See, for example, user interface 1106 in FIG. 11 where multiple modes are presented and the user selects one. At 1302, a new position is determined for a mechanical stop based at least in part on the desired mode. In some embodiments, each possible mode (e.g., presented to the user) has a corresponding position for the mechanical stop pre-determined. In some embodiments, a lookup table is used to map a desired mode to a new mechanical stop position. At 1304, a position control for the mechanical stop is set to a value which corresponds to the new position. As described above, there may be an actuator to move a peg within a cutout or adjust the height of a telescoping blade stopper, and some control input to the actuator may be set to the appropriate value.

Figure 13B:
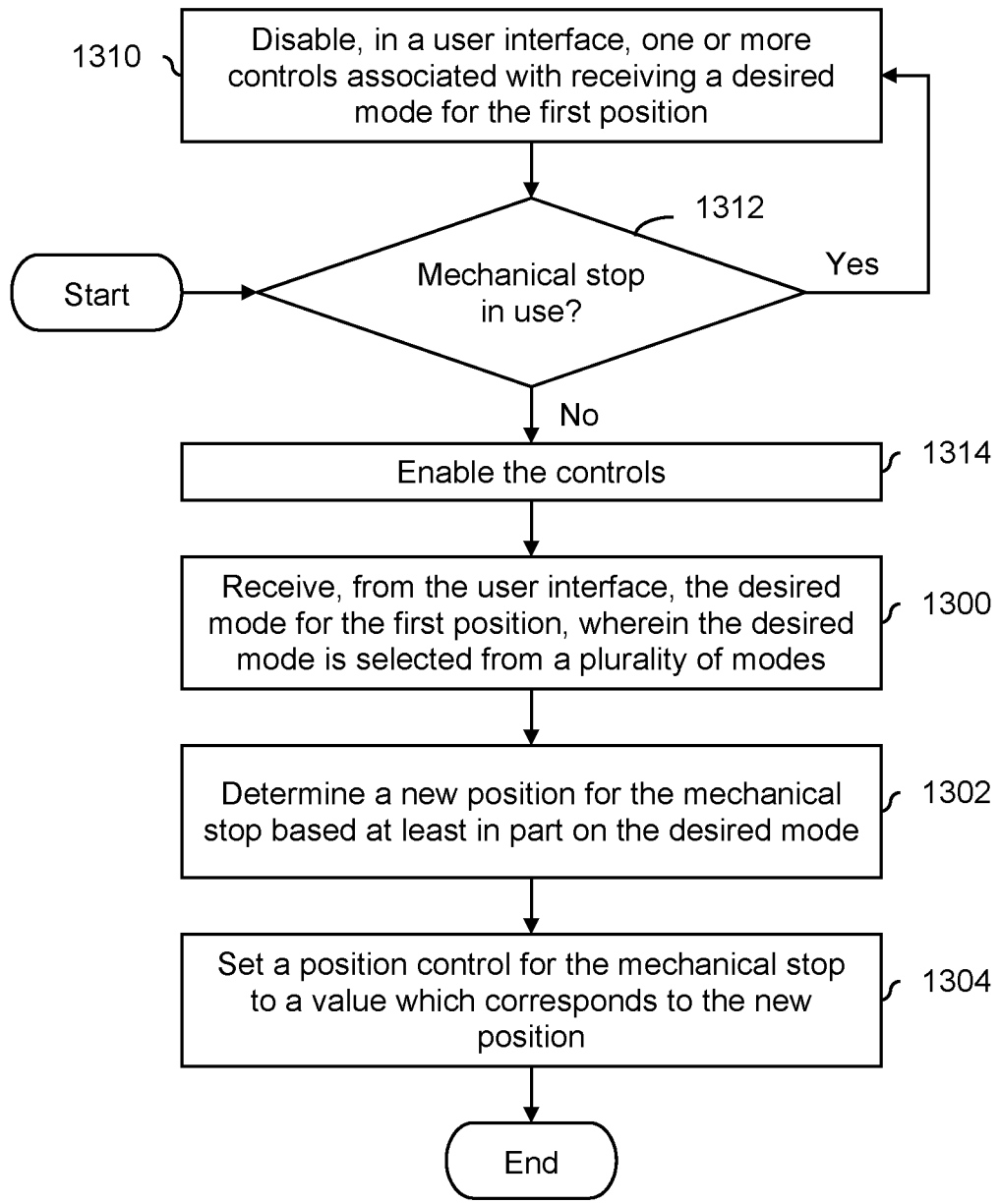
FIG. 13B is a flowchart illustrating an embodiment of a process to receive a desired mode from a user interface and adjust the position of a mechanical stop accordingly where the user interface is disabled if the mechanical stop is in use.

FIG. 13B is a flowchart illustrating an embodiment of a process to receive a desired mode from a user interface and adjust the position of a mechanical stop accordingly where the user interface is disabled if the mechanical stop is in use. For brevity, steps that have been previously discussed are not discussed in detail here.

At 1312, it is determined if a mechanical stop is in use. If so, one or more controls associated with receiving a desired mode for the first position are disabled in a user interface at 1313. As described above, this may include making controls un-selectable and/or not permitting inputs or other values to be entered. In this example, the process stays in this loop until the first stopper is no longer in use.

Once (or if) the mechanical stop is determined to not be in use at step 1312, the controls are enabled at 1314. At 1300, the desired mode for the first position is received from the user interface, wherein the desired mode is selected from a plurality of modes. At 1302, a new position for the mechanical stop is determined based at least in part on the desired mode. At 1304, a position control for the mechanical stop is set to a value which corresponds to the new position.

Figure 13C:
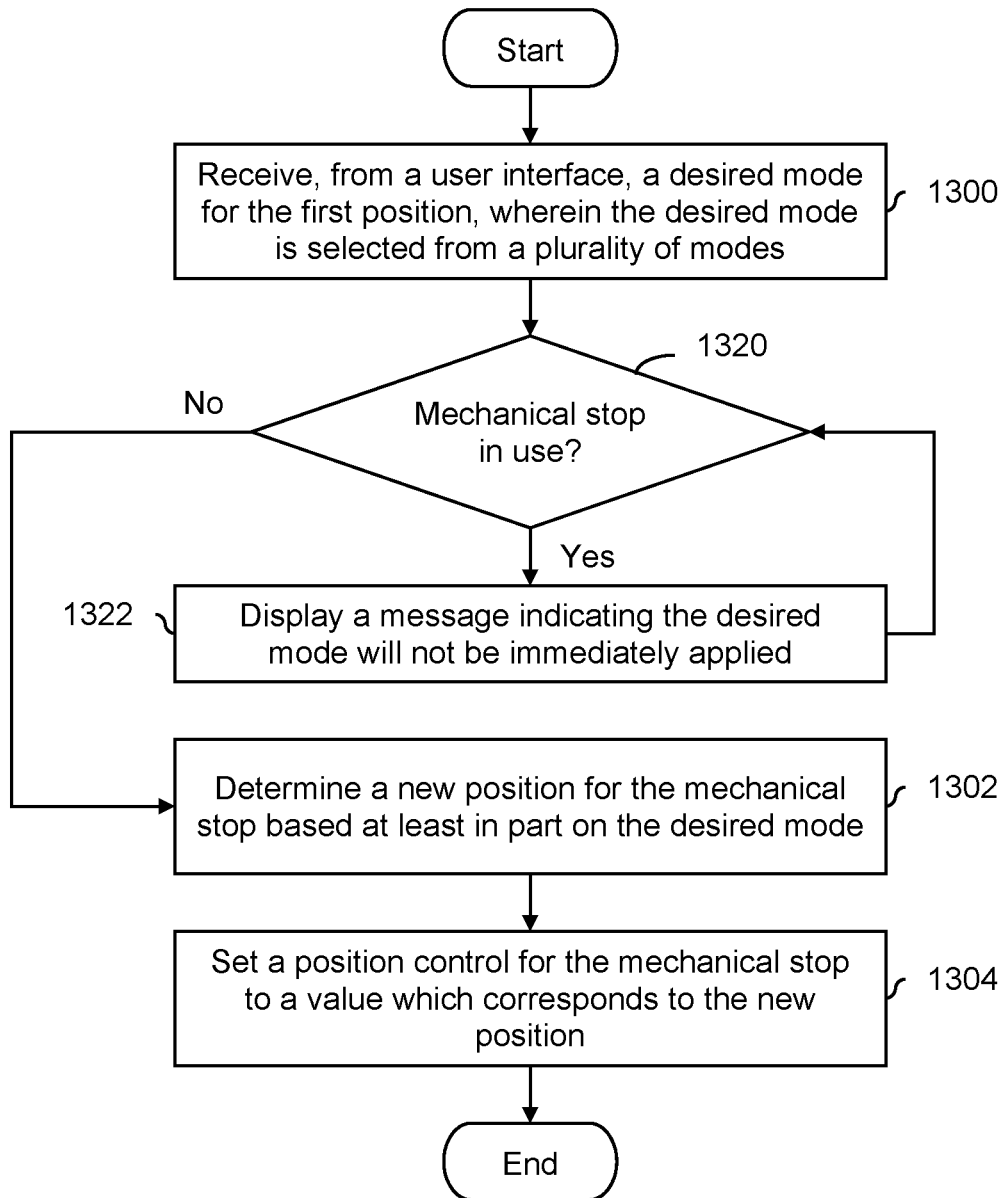
FIG. 13C is a flowchart illustrating an embodiment of a process to receive a desired mode from a user interface and adjust the position of a mechanical stop accordingly where the desired mode is held until the mechanical stop is free.

FIG. 13C is a flowchart illustrating an embodiment of a process to receive a desired mode from a user interface and adjust the position of a mechanical stop accordingly where the desired mode is held until the mechanical stop is free. As before, steps that have been previously discussed are not discussed in detail here for brevity.

At 1300, a desired mode for the first position is received from a user interface, wherein the desired mode is selected from a plurality of modes. At 1320, it is determined if a mechanical stop is in use. If so, a message indicating that the desired mode will not be immediately applied is displayed at 1322. As described above, a variety of messages may be displayed.

Once (or if) it is determined at step 1320 that the mechanical stop is no longer in use, a new position is determined for the mechanical stop based at least in part on the desired mode at 1302. In some embodiments, a new or second message is displayed, for example indicating that the mechanical stop has been adjusted to reflect the desired mode.

At 1304, a position control for the mechanical stop is set to a value which corresponds to the new position.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   measuring an amount of vibration associated with a propeller, wherein the propeller includes:
   a blade free to rotate about a longitudinal axis of the blade within at least a defined range of motion;
   a mechanical stop positioned to engage mechanically one or both of a first portion of the blade and a first structure coupled mechanically to the blade when the blade is in a first position at a first end of said defined rotational range of motion; and
   a magnetic stop positioned to engage magnetically one or both of a second portion of the blade and a second structure coupled mechanically to the blade when the blade is in a second position at a second end of said defined rotational range of motion;
   wherein the blade rotates to the first position against the mechanical stop when the propeller is rotated at a first rotational speed and the blade rotates to the second position against the magnetic stop when the propeller is rotated at a second rotational speed in a same direction as when the blade is in the first position;
   determining if the measured amount of vibration exceeds a threshold; and
   in the event it is determined that the measured amount of vibration exceeds the threshold:
   determining a desired blade position;
   in the event it is determined that the desired blade position is the first position, temporarily increasing the rotational speed of the propeller; and
   in the event it is determined that the desired blade position is the second position, temporarily decreasing the rotational speed of the propeller.

2. The method of claim 1, wherein determining the desired blade position includes setting the desired blade position to be a last programmed position.

3. The method of claim 1, wherein the first rotational speed is faster than the second rotational speed.

4. The method of claim 1, wherein the first structure is the same as the second structure.

5. The method of claim 1, wherein the first position is associated with hovering and the second position is associated with forward flight.

\* \* \* \* \*

UNITED STATES PATENT AND TRADEMARK OFFICE
CERTIFICATE OF CORRECTION

PATENT NO. : 10,933,989 B2
APPLICATION NO. : 16/584570
DATED : March 2, 2021
INVENTOR(S) : Vander Lind et al.

Page 1 of 1

It is certified that error appears in the above-identified patent and that said Letters Patent is hereby corrected as shown below:

In the Specification

In Column 4, Line(s) 5, delete "cu, where cu" and insert --$\alpha_1$, where $\alpha_1$--, therefor.

In Column 13, Line(s) 25, after "90°", insert --)--.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*